(12) United States Patent
Han et al.

(10) Patent No.: US 11,395,256 B2
(45) Date of Patent: Jul. 19, 2022

(54) COMMUNICATION METHOD, DEVICE, AND SYSTEM

(71) Applicant: Huawei Technologies Co., Ltd., Shenzhen (CN)

(72) Inventors: Feng Han, Shanghai (CN); Yinghao Jin, Shanghai (CN); Hong Li, Shanghai (CN); Wei Tan, Shanghai (CN); Hang Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 17/094,575

(22) Filed: Nov. 10, 2020

(65) Prior Publication Data

US 2021/0058896 A1 Feb. 25, 2021

Related U.S. Application Data

(63) Continuation of application No. PCT/CN2019/086047, filed on May 8, 2019.

(30) Foreign Application Priority Data

May 11, 2018 (CN) .......................... 201810449334.5

(51) Int. Cl.
*H04W 72/04* (2009.01)
*H04W 48/06* (2009.01)
(Continued)

(52) U.S. Cl.
CPC .......... *H04W 68/005* (2013.01); *H04W 76/11* (2018.02); *H04W 76/12* (2018.02); *H04W 76/27* (2018.02)

(58) Field of Classification Search
None
See application file for complete search history.

(56) References Cited

U.S. PATENT DOCUMENTS

2018/0097722 A1 4/2018 Callard
2020/0029322 A1\* 1/2020 Yu .......................... H04W 48/06

FOREIGN PATENT DOCUMENTS

CN 106572516 A 4/2017
CN 106851589 A 6/2017
(Continued)

OTHER PUBLICATIONS

"TP for supporting N2 requirements from SA2 (TS38.413)," 3GPP TSG-RAN WG3 NR AdHoc, Qingdao, China, R3-172337, total 14 pages, 3rd Generation Partnership Project, Valbonne, France (Jun. 27-29, 2017).

(Continued)

*Primary Examiner* — Gary Lafontant
(74) *Attorney, Agent, or Firm* — Leydig, Voit & Mayer, Ltd.

(57) ABSTRACT

A communication method, a device, and a communications system to improve flexibility of communication management is provided. The communication method includes: sending, by an access network device, a request message to a core network device, where the request message is used to request to set up a communication connection between the access network device and the core network device, and the communication connection corresponds to a first category; and receiving, by the access network device, a response message sent by the core network device, where the response message includes transport layer information, for uplink transmission, that corresponds to the first category.

20 Claims, 16 Drawing Sheets

(51) Int. Cl.
  *H04W 68/00* (2009.01)
  *H04W 76/12* (2018.01)
  *H04W 76/11* (2018.01)
  *H04W 76/27* (2018.01)

(56) References Cited

FOREIGN PATENT DOCUMENTS

| CN | 107864095 A | 3/2018 |
| WO | 2012164363 A1 | 12/2012 |
| WO | 2018069852 A1 | 4/2018 |

OTHER PUBLICATIONS

"3rd Generation Partnership Project; Technical Specification Group Radio Access Network; New frequency range for NR (3.3-4.2 GHz) (Release 15)," 3GPP TR 38.813 V15.0.0, total 29 pages, 3rd Generation Partnership Project, Valbonne, France (Mar. 2018).

"New SID on NR-IoT," 3GPP TSG RAN Meeting #78, Lisbon, Portugal, RP-172666, total 5 pages, 3rd Generation Partnership Project, Valbonne, France (Dec. 18-21, 2017).

"3rd Generation Partnership Project; Technical Specification Group Services and System Aspects; Study on Architecture for Next Generation System(Release 14)," 3GPP TR 23.799 V14.0.0, total 522 pages, 3rd Generation Partnership Project, Valbonne, France (Dec. 2016).

"3rd Generation Partnership Project; Technical Specification Group Radio Access Network; Study on New Radio Access Technology; Radio Access Architecture and Interfaces (Release 14)," 3GPP TR 38.801 V2.0.0, total 90 pages, 3rd Generation Partnership Project, Valbonne, France (Mar. 2017).

InterDigital Communications, "Cleanup of reference/definitions for 38.413," 3GPP TSG-RAN WG3 #98bis, Sophia Antipolis, France, R3-180063, total 81 pages, 3rd Generation Partnership Project, Valbonne, France (Jan. 22-26, 2018).

Nokia, Nokia Shanghai Bell, "Baseline CR for June version of RAN2 TS 38.300 (RAN3 part)," 3GPP TSG-RAN WG3 Meeting #99bis, Sanya, China, R3-182521, total 16 pages, 3rd Generation Partnership Project, Valbonne, France (Apr. 16-20, 2018).

* cited by examiner

COMMUNICATION METHOD, DEVICE, AND SYSTEM

CROSS-REFERENCE TO RELATED APPLICATIONS

This application is a continuation of International Application No. PCT/CN2019/086047, filed on May 8, 2019, which claims priority to Chinese Patent Application No. 201810449334.5, filed on May 11, 2018. The disclosures of the aforementioned applications are hereby incorporated by reference in their entireties.

TECHNICAL FIELD

This application relates to the communications field, and in particular, to a communications method, a device, and a system.

BACKGROUND

With comprehensive development and gradual deepening of researches on a next generation communications system, the industry reaches a basic consensus on specific content of researches on a fifth generation (5G) communications system. 5G supports various types of network deployments and application types, for example, supports an access capability characterized by higher-rate experience and higher bandwidth, information exchange characterized by a lower latency and higher reliability, and access and management of larger-scale and low-cost machine-type communications (MTC) devices. It can be learned from the above that in a 5G scenario, a larger quantity of devices are supported to access a network. A requirement for massive connectivity in the 5G scenario is increased to a new level. For example, in a metro coverage area, in view of a connection density, one million devices per square kilometer are supported to access. Therefore, how to efficiently manage access and communication of a large quantity of communications devices is an urgent problem to be resolved in the industry.

SUMMARY

This application provides a communication method, a device, and a system, to improve flexibility of communication management.

According to a first aspect, a communication method is provided. The communication method includes: sending, by an access network device, a request message to a core network device, where the request message is used to request to set up a communication connection between the access network device and the core network device, and the communication connection corresponds to a first category; and receiving, by the access network device, a response message sent by the core network device, where the response message includes transport layer information, for uplink transmission, that corresponds to the first category.

In this embodiment of this application, the communication connection corresponding to the first category is set up between the access network device and the core network device, to transmit data corresponding to the first category. In this way, the communication connection between the access network device and the core network device may be set up based on the category, to facilitate corresponding data transmission based on the category, thereby improving flexibility of communication management.

In a possible implementation, the first category is a first network slice, a first packet data unit (PDU) session type, or a first access technology.

In this embodiment of this application, a network access and communication process of a terminal device may be managed based on the network slice, the PDU session type, or the access technology, to avoid separately setting up a communication connection between an access network device and a core network device for each terminal device, thereby reducing related signaling overheads and improving management efficiency.

In a possible implementation, the method further includes: receiving, by the access network device, uplink data from the terminal device; and when the uplink data belongs to the first category, sending, by the access network device, the uplink data to the core network device based on the transport layer information for the uplink transmission.

In this embodiment of this application, the access network device does not need to perform the uplink transmission based on a granularity of the terminal device. To be specific, the access network device does not need to identify the terminal device corresponding to the uplink transmission, and only needs to distinguish the category corresponding to data for the uplink transmission. In this way, the data corresponding to the category is mapped to the communication connection corresponding to the category, and then the data is transmitted to the core network device through the communication connection corresponding to the category, so that signaling overheads can be reduced, and communication efficiency can be improved.

In a possible implementation, the terminal device is currently configured in a first radio resource control (RRC) mode, and the first RRC mode includes at least one of the following features: the terminal device stores a context corresponding to the first category; the terminal device stores an identifier of the first category; the terminal device is configured to transmit data corresponding to the first category; and the terminal device is configured to perform communication based on a paging cycle of the first category.

In this embodiment of this application, the terminal device is configured to be in the first RRC mode, to support category-based data transmission, thereby improving management efficiency.

In a possible implementation, the first category is the first network slice, and the method further includes: sending, by the access network device, a first notification message to the terminal device, where the first notification message includes at least one of the following information: an area identifier of the first network slice, an identifier of the first network slice, a paging cycle of the first network slice, a paging area of the first network slice, and security information of the first network slice.

In this embodiment of this application, when the first category is the first network slice, the first notification message is sent to the terminal device to indicate configuration information related to the first network slice, so that the terminal device performs first category-based communication, thereby improving communication management efficiency.

In a possible implementation, the first category is the first PDU session type, and the method further includes: sending, by the access network device, a second notification message to the terminal device, where the second notification message includes an area identifier of the first PDU session type, an identifier of the first PDU session type, a paging cycle of the first PDU session type, a paging area of the first PDU session type, and security information of the first PDU session type.

In this embodiment of this application, when the first category is the first PDU session type, the second notification message is sent to the terminal device to indicate configuration information related to the first PDU session type, so that the terminal device performs first category-based communication, thereby improving communication management efficiency.

In a possible implementation, the first category is the first access technology, and the method further includes: sending, by the access network device, a third notification message to the terminal device, where the third notification message includes an area identifier of the first access technology, an identifier of the first access technology, a paging cycle of the first access technology, a paging area of the first access technology, and security information of the first access technology.

In this embodiment of this application, when the first category is the first access technology, the third notification message is sent to the terminal device to indicate configuration information related to the first access technology, so that the terminal device performs first category-based communication.

In a possible implementation, the request message includes transport layer information, for downlink transmission, that corresponds to the first category, and the method further includes: receiving, by the access network device from the core network device, first downlink data corresponding to the first category; and broadcasting, by the access network device, the first downlink data.

In this embodiment of this application, the access network device sends the downlink data corresponding to the first category to the terminal device in a broadcast manner, so that the terminal device receives the downlink data. This provides a flexible manner of transmitting the downlink data.

In a possible implementation, the method further includes: receiving, by the access network device, a first paging message from the core network device, where the first paging message includes second downlink data corresponding to the first category; and sending, by the access network device, a second paging message, where the second paging message includes the second downlink data.

In this embodiment of this application, the core network device sends the downlink data corresponding to the first category to the access network device in a form of a paging message, and the access network device also sends the downlink data corresponding to the first category to the terminal device in a form of a paging message, so that the terminal device receives the downlink data. This provides a flexible manner of transmitting the downlink data.

In a possible implementation, the method further includes: the communication connection is used to transmit uplink data and/or downlink data of at least two terminal devices.

In this embodiment of this application, the communication connection between the core network device and the access network device can transmit data for two or more terminal devices, so that a plurality of terminal devices share the communication connection, thereby reducing related signaling overheads and improving communication resource utilization.

According to a second aspect, a communication method is provided. The method includes: receiving, by a core network device, a request message from an access network device, where the request message is used to request to set up a communication connection between the access network device and the core network device, and the communication connection corresponds to a first category; and sending, by the core network device, a response message to the access network device, where the response message includes transport layer information, for uplink transmission, that corresponds to the first category.

In this embodiment of this application, the communication connection corresponding to the first category is set up between the access network device and the core network device, to transmit data corresponding to the first category. Therefore, the communication connection between the access network device and the core network device may be set up based on the category, to facilitate corresponding data transmission based on the category, thereby improving flexibility of communication management.

In a possible implementation, the first category is a first network slice, a first packet data unit (PDU) session type, or a first access technology.

In this embodiment of this application, a network access and communication process of a terminal device may be managed based on the network slice, the PDU session type, or the access technology, to avoid separately setting up a communication connection between an access network device and a core network device for each terminal device, thereby reducing related signaling overheads and improving management efficiency.

In a possible implementation, the request message includes transport layer information, for downlink transmission, that corresponds to the first category, and the method further includes: receiving, by the core network device, first downlink data corresponding to the first category; and sending, by the core network device to the access network device based on the transport layer information for the downlink transmission, the first downlink data corresponding to the first category.

In this embodiment of this application, the core network device does not need to perform the uplink transmission based on a granularity of the terminal device. To be specific, the core network device does not need to identify the terminal device corresponding to the downlink transmission; and only needs to distinguish the category corresponding to data for the downlink transmission, and transmits the data to the access network device based on the category. In this way, signaling overheads can be reduced, and communication efficiency can be improved.

In a possible implementation, the method further includes: receiving, by the core network device, second downlink data corresponding to the first category; and sending, by the core network device, a first paging message to the access network device, where the first paging message includes the second downlink data.

In a possible implementation, the method further includes: the communication connection is used to transmit uplink data and/or downlink data of at least two terminal devices.

According to a third aspect, a communication method is provided. The communication method includes: receiving, by a terminal device, first RRC mode indication information sent by an access network device, where the first RRC mode indication information is used to indicate the terminal device to enter a first RRC mode, and the first RRC mode includes at least one of the following features: the terminal device stores a context corresponding to a first category; the terminal device stores an identifier of the first category; the terminal device is configured to transmit data corresponding to the first category; the terminal device is configured to perform communication based on a paging cycle of the first category; and the terminal device enters the first RRC mode based on the first RRC mode indication information.

In this embodiment of this application, the terminal device is configured to be in the first RRC mode, to support category-based data transmission, thereby improving management efficiency.

In a possible implementation, the first category is a first network slice, a first packet data unit (PDU) session type, or a first access technology.

In this embodiment of this application, a network access and communication process of a terminal device may be managed based on the network slice, the PDU session type, or the access technology, to avoid separately setting up a communication connection between an access network device and a core network device for each terminal device, thereby reducing related signaling overheads and improving management efficiency.

In a possible implementation, the method further includes: sending, by the terminal device, uplink data to the access network device, where the uplink data includes the identifier of the first category.

In this embodiment of this application, the terminal device adds the identifier of the first category to the uplink data, so that the access network device transmits the uplink data based on the first category, thereby improving communication efficiency.

In a possible implementation, the method further includes: receiving, by the terminal device, downlink data from the access network device, where the downlink data includes the identifier of the first category.

In this embodiment of this application, the downlink data received by the terminal device includes the identifier of the first category, so that the terminal device identifies the category to which the downlink data belongs. This provides a flexible data transmission method.

In a possible implementation, the downlink data is carried in a broadcast message.

In this embodiment of this application, the terminal device receives, by using the broadcast message, the downlink data corresponding to the first category. This provides a flexible data transmission method.

In a possible implementation, the downlink data is carried in a paging message.

In this embodiment of this application, the terminal device receives, by using the paging message, the downlink data corresponding to the first category. This provides a flexible data transmission method.

In a possible implementation, the first category is the first network slice, and the method further includes: receiving, by the terminal device, a first notification message sent by the access network device, where the first notification message includes at least one of the following information: an area identifier of the first network slice, an identifier of the first network slice, a paging cycle of the first network slice, a paging area of the first network slice, and security information of the first network slice.

In this embodiment of this application, when the first category is the first network slice, the terminal device receives the first notification message from the access network device, and the first notification message is used to indicate configuration information related to the first network slice, so that the terminal device performs first category-based communication, thereby improving communication management efficiency.

In a possible implementation, the first category is the first PDU session type, and the method further includes: receiving, by the terminal device, a second notification message sent by the access network device, where the second notification message includes an area identifier of the first PDU session type, an identifier of the first PDU session type, a paging cycle of the first PDU session type, a paging area of the first PDU session type, and security information of the first PDU session type.

In this embodiment of this application, when the first category is the first PDU session type, the terminal device receives the first notification message from the access network device, and the first notification message is used to indicate configuration information related to the first PDU session type, so that the terminal device performs first category-based communication, thereby improving communication management efficiency.

In a possible implementation, the first category is the first access technology, and the method further includes: receiving, by the terminal device, a third notification message sent by the access network device, where the third notification message includes an area identifier of the first access technology, an identifier of the first access technology, a paging cycle of the first access technology, a paging area of the first access technology, and security information of the first access technology.

In this embodiment of this application, when the first category is the first access technology, the terminal device receives the first notification message from the access network device, and the first notification message is used to indicate configuration information related to the first access technology, so that the terminal device performs first category-based communication, thereby improving communication management efficiency.

According to a fourth aspect, an access network device is provided. The access network device is configured to perform the method according to any one of the first aspect or the possible implementations of the first aspect. Specifically, the access network device includes a module configured to perform the method according to any one of the first aspect or the possible implementations of the first aspect.

According to a fifth aspect, a core network device is provided. The core network device is configured to perform the method according to any one of the second aspect or the possible implementations of the second aspect. Specifically, the core network device includes a module configured to perform the method according to any one of the second aspect or the possible implementations of the second aspect.

According to a sixth aspect, a terminal device is provided. The terminal device is configured to perform the method according to any one of the third aspect or the possible implementations of the third aspect. Specifically, the terminal device includes a module configured to perform the method according to any one of the third aspect or the possible implementations of the third aspect.

According to a seventh aspect, an access network device is provided. The access network device includes a communications interface and a processor. The processor is configured to execute an instruction, to control the communications interface to receive a signal and/or send a signal, and when the processor executes the instruction, the execution enables the processor to perform the method according to any one of the first aspect or the possible implementations of the first aspect. Optionally, the access network device further includes a memory. The memory is configured to store the instruction, and the processor is configured to execute the instruction stored in the memory.

According to an eighth aspect, a core network device is provided. The core network device includes a communications interface and a processor. The processor is configured to execute an instruction, to control the communications interface to receive a signal and/or send a signal, and when the processor executes the instruction, the execution enables the processor to perform the method according to any one of the second aspect or the possible implementations of the second aspect. Optionally, the foregoing core network device further includes a memory. The memory is configured to store the instruction, and the processor is configured to execute the instruction stored in the memory.

According to a ninth aspect, a terminal device is provided. The terminal device includes a communications interface and a processor. The processor is configured to execute an instruction, to control the communications interface to receive a signal and/or send a signal, and when the processor executes the instruction, the execution enables the processor to perform the method according to any one of the third aspect or the possible implementations of the third aspect. Optionally, the foregoing core network device further includes a memory. The memory is configured to store the instruction, and the processor is configured to execute the instruction stored in the memory.

According to a tenth aspect, a communications system is provided. The communications system includes the access network device according to any one of the fourth aspect or the possible implementations of the fourth aspect and the core network device according to any one of the fifth aspect or the possible implementations of the fifth aspect. Alternatively, the communications system includes the access network device according to any one of the seventh aspect or the possible implementations of the seventh aspect and the core network device according to any one of the eighth aspect or the possible implementations of the eighth aspect.

According to an eleventh aspect, a computer-readable medium is provided, and is configured to store a computer program. The computer program includes an instruction used to perform the method according to any one of the first aspect or the possible implementations of the first aspect.

According to a twelfth aspect, a computer-readable medium is provided, and is configured to store a computer program. The computer program includes an instruction used to perform the method according to any one of the second aspect or the possible implementations of the second aspect.

According to a thirteenth aspect, a computer-readable medium is provided, and is configured to store a computer program. The computer program includes an instruction used to perform the method according to any one of the third aspect or the possible implementations of the third aspect.

DESCRIPTION OF EMBODIMENTS

Figure 1:
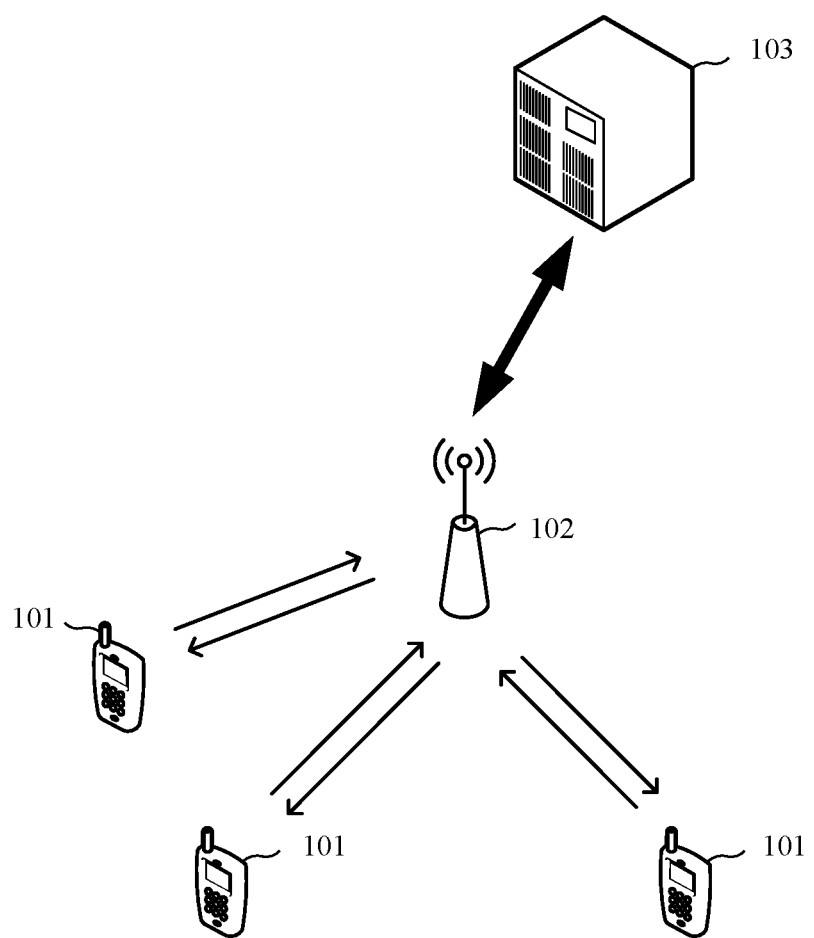
FIG. 1 is a schematic diagram of an application scenario according to an embodiment of this application.

The following describes technical solutions of this application with reference to accompanying drawings.

The technical solutions of the embodiments of this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, a user apparatus, or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. The terminal device may alternatively be a communications device in an internet of things (IoT), or may be a machine-type communications (MTC) device. This is not limited in this embodiment of this application.

An access network device in the embodiments of this application may be a base transceiver station (BTS) in a global system for mobile communications (GSM) or in a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the access network device may be a relay node, an access point, a vehicle-mounted device, a wearable device, a network device in a future 5G network, a network device in a future evolved PLMN network, or the like. This is not limited in the embodiments of this application.

As described in the foregoing, a future communications system, including a 5G communications system, meets a requirement of supporting ultra-large-scale connections. For example, in an internet of things (IoT) scenario, millions of communications devices are supported. Therefore, the access network device needs to meet a requirement of supporting ultra-large-scale access of communications devices. This poses a new challenge to how to access and manage a communication process of a large quantity of communications devices.

To resolve the foregoing problem, the embodiments of this application provide a new communication method. The following describes the method in detail with reference to the accompanying drawings.

FIG. 1 is a schematic diagram of an application scenario according to an embodiment of this application. As shown in FIG. 1, a plurality of terminal devices 101 set up communication connections to a core network device 103 through an access network device 102. The access network device 102 provides a connection to the core network (CN) for the terminal devices 101. The access network device 102 may be, for example, a radio network controller ( ), or may be a base station. The radio network controller may be disposed in the base station, or may exist as a separate entity. For the terminal devices 101, refer to the content described above. The core network device 103 may include but is not limited to any one of the following: a user plane function (UPF) entity, an access and mobility management function (AMF) entity, a session management function (SMF) entity, or the like.

Figure 2:
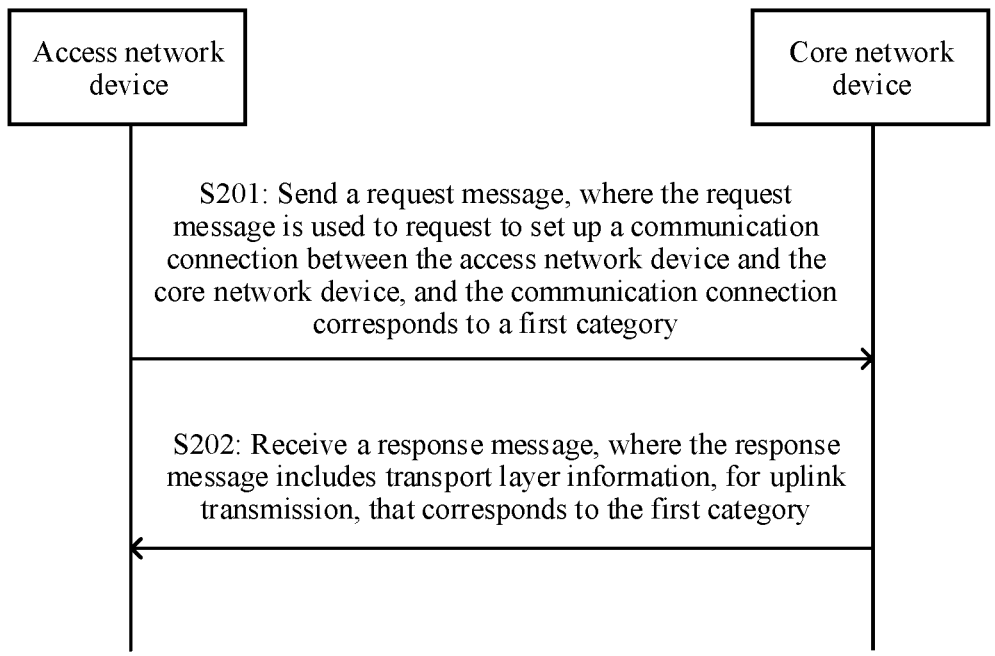
FIG. 2 is a schematic flowchart of a communication method according to an embodiment of this application.

FIG. 2 is a schematic flowchart of a communication method according to an embodiment of this application. As shown in FIG. 2, the method in FIG. 2 includes S201 and S202. Specific steps are as follows:

S201: An access network device sends a request message to a core network device, and correspondingly, the core network device receives the request message sent by the access network device, where the request message is used to request to set up a communication connection between the access network device and the core network device, and the communication connection corresponds to a first category.

Optionally, the communication connection may be set up between the access network device and the core network device based on the category. The foregoing category may enable each communication connection to serve one or more terminal devices.

For example, the foregoing category may be obtained through division based on different network slices. For example, the first category may be a first network slice. In an example, the communication connection may be used to transmit uplink data and/or downlink data of a terminal device corresponding to the first network slice. For another example, the first network slice may correspond to one piece of single network slice selection assistance information (S-NSSAI).

Similarly, the foregoing category may alternatively be obtained through division based on a network slice type. For example, the foregoing first category may correspond to one slice/service type (SST).

Alternatively, the foregoing category may be obtained through division based on different packet data unit (PDU) session types. Different PDU session types include but are not limited to the following: internet protocol version 4 (IPv4), internet protocol version 6 (IPv6), IPv4v6, an ethernet session, or an unstructured session. For example, the first category may be a first PDU session type. In an example, the communication connection may be used to transmit data corresponding to the first PDU session type. If a first terminal device performs communication by using the first PDU session type, the communication connection may be used to transmit uplink data and/or downlink data of the first terminal device.

Alternatively, the foregoing category may be obtained through division based on different access technologies. For example, the foregoing first category may be a first access technology. In an example, if a second terminal device accesses a communications network by using the first access technology, the communication connection may be used to transmit communication data of the second terminal device. Types of different access technologies include but are not limited to the following:

cellular network access; non-3rd generation partnership project (3GPP) access; 3GPP access; wireless local area network (WLAN) access; GSM/EDGE radio access network (GERAN) access, where GSM represents global system for mobile communications and EDGE represents enhanced data rates for GSM evolution; UMTS terrestrial radio access network (UTRAN) access, where a UMTS represents a universal mobile telecommunications system; or evolved UTRAN (EUTRAN) access.

Optionally, the communication connection may be used to transmit the uplink data, or may be used to transmit the downlink data. The data transmitted through the communication connection may include control signaling, or may include another type of data, for example, image data, audio data, and video data.

Optionally, the communication connection may be a tunnel set up between the access network device and the core network device.

Optionally, one or more communication connections may be set up between the access network device and the core network device for each category. For example, it is assumed that the first category may be the first network slice. One or more communication connections may be set up between the access network device and the core network device for the first network slice. For example, the foregoing category may be obtained through division based on different PDU session types, and one or more communication connections may be set up between the access network device and the core network device for the first PDU session type. Alternatively, the foregoing category may be obtained through division based on different access technologies. For example, one or more communication connections may be set up between the access network device and the core network device for the first access technology.

S202: The access network device receives a response message sent by the core network device, and correspondingly, the core network device sends the response message to the access network device, where the response message includes transport layer information, for uplink transmission, that corresponds to the first category.

Optionally, the transport layer information, for the uplink transmission, that corresponds to the first category may usually refer to an internet protocol (internet protocol, IP) address and a tunnel identifier for the uplink transmission that correspond to the first category. For example, a transport layer address for the uplink transmission may usually be an IP address of the core network device. The tunnel identifier is used for user plane transmission of the communication resource between the access network device and the core network device. For example, the tunnel identifier may be a GTP tunnel endpoint identifier. A GTP represents a GPRS tunneling protocol.

Optionally, the response message may further include a user identifier list corresponding to the first category, and the user identifier list includes one or more user identifiers. For example, the user identifier is a 5G-SAE-temporary mobile subscriber identity S-TMSI (5G SAE-Temporary Mobile Subscription Identifier, 5G-S-TMSI), where SAE represents system architecture evolution (System Architecture Evolution, SAE); or a 5G globally unique temporary identifier (5G Globally Unique Temporary Identifier, 5G-GUTI). The access network device sends, based on the user identifier list to the core network device, uplink data that corresponds to the first category and that belongs to the user identifier list.

Optionally, in S201, the request message may include the transport layer information, for the downlink transmission, that corresponds to the communication connection. Optionally, the transport layer information, for the downlink transmission, that corresponds to the first category may usually refer to an IP address and a tunnel identifier for downlink transmission that correspond to the first category. For example, a transport layer address for the downlink transmission may usually be an IP address of the access network device. The tunnel identifier is used for user plane transmission of the communication connection between the access network device and the core network device. For example, the tunnel identifier may be a GTP tunnel endpoint identifier (GTP Tunnel Endpoint Identifier).

In this embodiment of this application, the communication connection corresponding to the first category is set up between the access network device and the core network device, to transmit data corresponding to the first category. Therefore, the communication connection between the access network device and the core network device may be set up based on the category, to facilitate corresponding data transmission based on the category, thereby improving flexibility of communication management.

In this embodiment of this application, when a large quantity of terminal devices access a network, a network access and communication process of the terminal devices can be managed based on the category, to avoid separately setting up a communication connection between an access network device and a core network device for each terminal device, thereby reducing related signaling overheads and improving management efficiency.

Optionally, the access network device may send, to the core network device based on the transport layer information, for the uplink transmission, that corresponds to the first category and that is included in the response message, the uplink data corresponding to the first category.

Optionally, when sending the uplink data corresponding to the first category to the core network device, the access network device may carry a user identifier corresponding to the uplink data. In this way, an intermediate transport network node can schedule a policy based on the user identifier, so that the core network device determines a user to which the uplink data belongs. For example, the user identifier may be the 5G-S-TMSI or the 5G-GUTI.

Optionally, when sending the uplink data corresponding to the first category to the core network device, the access network device may further carry a quality of service (QoS) flow identifier corresponding to the uplink data, so that the core network device determines a QoS flow to which the uplink data belongs. For example, the user identifier is the QoS flow identifier (QoS flow ID).

In some embodiments, the access network device receives the uplink data from the terminal device. When the uplink data belongs to the first category, the access network device may send the uplink data to the core network device based on the transport layer information for the uplink transmission. The uplink data may include an identifier of the first category, so that the access network device determines that the uplink data belongs to the first category. That the access network device sends the uplink data to the core network device based on the transport layer information for the uplink transmission may mean that the access network device transmits the foregoing uplink data through the communication connection corresponding to the first category. Optionally, the uplink data may further include the user identifier, so that the access network device determines the user to which the uplink data belongs. The access network device sends the uplink data to the core network device based on the transport layer information for the uplink transmission, and carries the user identifier. For example, the user identifier may be a cell radio network temporary identifier (C-RNTI), or the user identifier is the 5G-S-TMSI or the 5G-GUTI.

Optionally, the core network device may send, to the access network device based on the transport layer information, for the downlink transmission, that corresponds to the first category and that is included in the request message, the downlink data corresponding to the first category.

In some embodiments, the access network device may receive, from the core network device, first downlink data corresponding to the first category; and the access network device may broadcast the first downlink data to the terminal device. For example, the access network device may send a broadcast message, and the broadcast message may include the first downlink data. Further, the broadcast message may further include the identifier of the first category.

In a specific example, the terminal device may be set, to trigger the terminal device to receive the first downlink data that is broadcast by the access network device. For example, the terminal device may receive the broadcast data based on a multimedia broadcast multicast service (MBMS) technology or a single-cell point-to-multipoint (SC-PTM) technology. A time for the terminal device to listen to the broadcast message may be defined, so that the terminal device listens to the broadcast message including the first downlink data within a predefined time.

In some other embodiments, the access network device may receive, from the core network device, the first downlink data that corresponds to the first category and that carries the user identifier. For example, the access network device may send the broadcast message, and the broadcast message may include the first downlink data and the user identifier. For example, the user identifier is the C-RNTI, or the user identifier is the 5G-S-TMSI, or the 5G-GUTI.

In some other embodiments, the downlink data may also be sent by using a paging message. For example, the access network device may receive a first paging message from the core network device, and the first paging message includes second downlink data corresponding to the first category; and the access network device may send a second paging message, and the second paging message includes the second downlink data. The second paging message may also include the identifier of the first category.

In a specific embodiment, during downlink data transmission, the terminal device may determine a paging occasion (PO) and a paging frame (PF) that correspond to the first category, and then receive the downlink data based on the PO and the PF.

Figure 3:
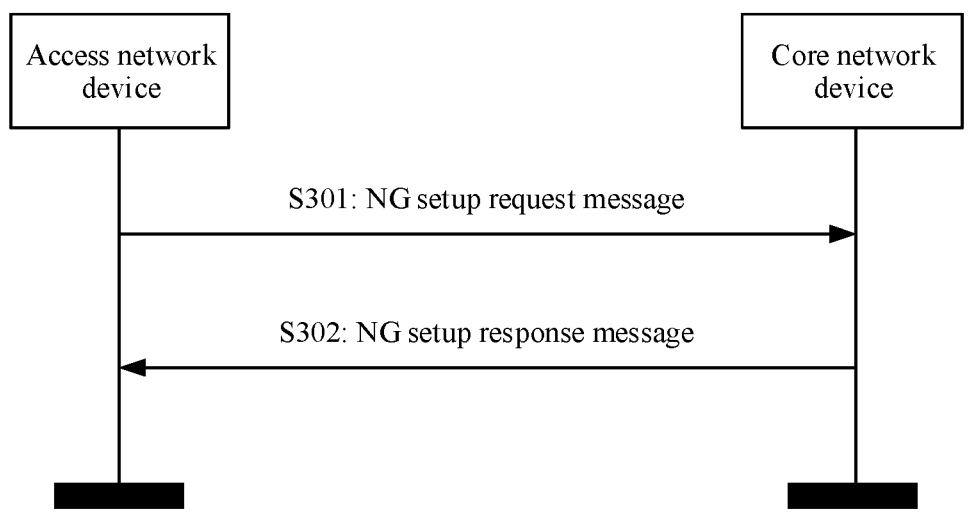
FIG. 3 is a schematic flowchart of a communication method according to another embodiment of this application.

FIG. 3 is a schematic flowchart of a communication method according to another embodiment of this application. As shown in FIG. 3, in some embodiments, the foregoing request message may be referred to as an NG setup request message, and the foregoing response message may be referred to as an NG setup response message. NG is used to indicate a communications interface between an access network device and a core network device. The communications interface may also be referred to as a next-generation user plane (NG-U) interface. The method in FIG. 3 includes the following steps:

S301: The access network device sends the NG setup request message to the core network device, and correspondingly, the core network device receives the NG setup request message sent by the access network device, where the NG setup request message in FIG. 3 may be the request message in FIG. 2.

For example, a first category is a first network slice, and the NG setup request message may include information listed in Table 1. In Table 1 and Table 2, transport layer information may include an endpoint IP address and an endpoint identifier of a GTP tunnel protocol-user plane (GTP-U), and the endpoint identifier may be a GTP-tunnel endpoint number (TEID). The endpoint IP address may be used to indicate an IP address, for uplink transmission, that corresponds to the first network slice or an IP address, for downlink transmission, that corresponds to the first network slice.

TABLE 1

>> PLMN identifier
>> Tracking area identifier (tracking area identifier, TAI) slice support list
   >>> Identifier of the first network slice
   >>> Transport layer information
      >>>   Endpoint IP address (which is used to indicate the IP address, for the downlink transmission, that corresponds to the first network slice)
      >>>   GTP-U endpoint identifier (GTP-TEID)

Optionally, one or more communication connections may be set up between the access network device and the core network device for the first network slice. For example, for the identifier of the first network slice, Table 1 may include a plurality of pieces of the transport layer information.

S302: The core network device sends the NG setup response message to the access network device, and correspondingly, the access network device receives the NG setup response message sent by the core network device, where the NG setup response message in FIG. 3 may be the response message in FIG. 2.

For example, the first category is the first network slice, and the NG setup response message may include the information listed in Table 2.

TABLE 2

>> PLMN identifier
>> AMF slice support list (TAI slice support list)
   >>> Identifier of the first network slice
  >> Transport layer information
      >>>   Endpoint IP address (which is used to indicate the IP address, for the uplink transmission, that corresponds to the first network slice)
      >>>   GTP-U endpoint identifier (GTP-TEID)

Optionally, one or more communication connections may be set up between the access network device and the core network device for the first network slice. For example, for the identifier of the first network slice, Table 2 may include a plurality of pieces of the transport layer information.

Figure 4:
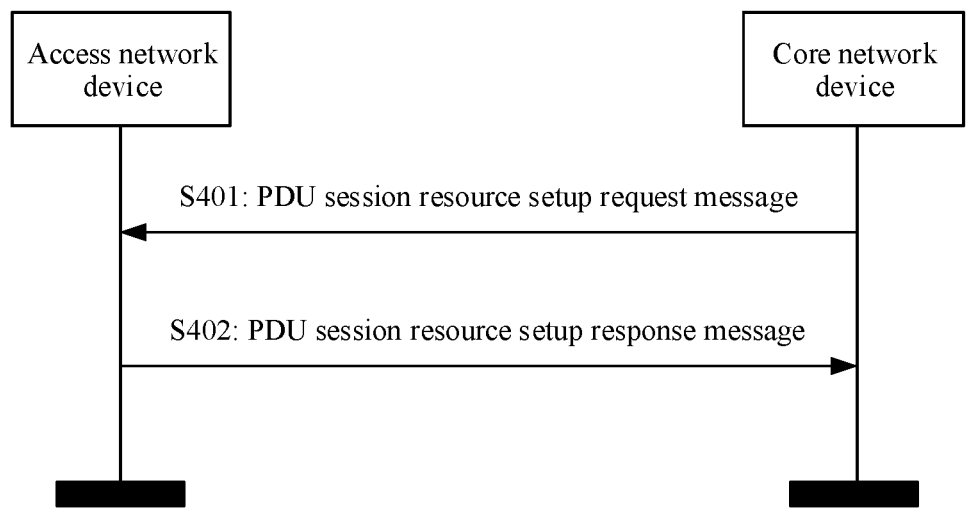
FIG. 4 is a schematic flowchart of a communication method according to another embodiment of this application.

FIG. 4 is a schematic flowchart of a communication method according to another embodiment of this application. As shown in FIG. 4, in some embodiments, the foregoing request message may alternatively be set up by a single terminal device in a process of setting up a PDU session. The method in FIG. 4 includes the following steps:

S401: A core network device sends a PDU session resource setup request message to an access network device, and correspondingly, the access network device receives the PDU session resource setup request message sent by the core network device, where the request message in FIG. 2 may be the PDU session resource setup request message.

S402: The access network device sends a PDU session resource setup response message to the core network device, and correspondingly, the core network device receives the PDU session resource setup response message sent by the access network device, where the response message in FIG. 2 may be the PDU session resource setup response message.

In the example in FIG. 4, a based on a category level-based communication connection between the access network device and the core network device may be set up in a process in which the single terminal device sets up the PDU session.

In this embodiment of this application, the communication connection corresponding to a first category may be set up by using various types of signaling, thereby improving communication management efficiency.

In some embodiments, the access network device may further send a first update message to the core network device. The first update message is used to update a category supported by the access network device or transport layer information, for downlink transmission, that corresponds to the category supported by the access network device. The transport layer information may be an IP address or a tunnel address, for the downlink transmission, that corresponds to the category. Alternatively, the transport layer information may be listed in Table 1. For example, the foregoing first update message may be an NG radio access network reconfiguration update message.

In some embodiments, the core network device may further send a second update message to the access network device. The second update message is used to update a category supported by the core network device or transport layer information, for uplink transmission, that corresponds to the category supported by the core network device. The transport layer information may be an IP address or a tunnel address, for the uplink transmission, that corresponds to the category. Alternatively, the transport layer information may be listed in Table 2. For example, the foregoing second update message may be an AMF reconfiguration update (AMF configuration update) message.

In an example, it is assumed that a quantity of network slices supported by the core network device is less than that of network slices supported by the access network device. For example, the access network device supports a first network slice and a second network slice, and the core network device supports only the first network slice. In this case, the core network device only sends the response message carrying a transmission layer address, for the uplink transmission, that corresponds to the first network slice, and the access network device may release a transport layer address that is for the downlink transmission and that is allocated to the second network slice.

Optionally, the request message, the response message, and/or another communication message related to the first category may include an identifier of the first category. The identifier of the first category may be, for example, an identifier of the first network slice, an identifier of a first PDU session type, an identifier of a first sub network slice (SST), or an identifier of a first access technology.

In an example, if the first category is the first network slice, the PDU session resource setup request message may include the following information:

TABLE 3

>>> Identifier of the first network slice
>>> Transport layer information
    >>>    Endpoint IP address (which is used to indicate the IP address, for the uplink transmission, that corresponds to the first network slice)
    >>>    GTP-U endpoint identifier (GTP-TEID)

In an example, if the first category is the first network slice, the PDU session resource setup response message may include the following information:

TABLE 4

>>> Identifier of the first network slice
>>> Transport layer information
    >>>    Endpoint IP address (which is used to indicate the IP address, for the downlink transmission, that corresponds to the first network slice)
    >>>    GTP-U endpoint identifier (GTP-TEID)

Optionally, the access network device may further send a notification message to a terminal device corresponding to the first category, to indicate configuration information and the like related to the first category to the terminal device. The terminal device may perform, based on the notification message, first category-based data transmission. For example, a network may be accessed, a session process may be set up, and a data transmission resource (for example, a time-frequency resource) may be allocated based on the notification message. The notification message may be sent in a form of a broadcast message, or may be sent in a multicast manner, or may be sent in a form of dedicated signaling. For example, the notification message may be sent in a form of a radio resource control (RRC) connection release message. The notification message may be a first notification message, a second notification message, or a third notification message in the following, and details are described below.

In some embodiments, if the first category is the first network slice, the method in this embodiment of this application further includes: The access network device may further send the first notification message to the terminal device, where the notification message includes at least one of the following information: an identifier of the first network slice, an area identifier of the first network slice, a paging cycle of the first network slice, a paging area of the first network slice, and security information of the first network slice.

In some examples, the identifier of the first network slice may be used to indicate that the terminal device can perform data transmission of the first network slice.

In some examples, the area identifier of the first network slice may be, for example, a cell list supporting the first network slice, or an area identifier supporting the first network slice. The terminal device performs the data transmission of the first network slice in an area supported by the first network slice.

In some examples, the paging area of the first network slice may be, for example, a paging cell list supporting the first network slice, or a paging area identifier supporting the first network slice. The paging area may be the same as or different from the area identifier of the first network slice. The terminal device receives a paging command for the first network slice or receive downlink data for the first network slice within a paging area supported by the first network slice.

In some examples, the paging cycle of the first network slice is used by the terminal device to receive the paging command for the first network slice or receive the downlink data for the first network slice in the paging cycle.

In some examples, the security information of the first network slice may be, for example, a next hop chaining counter (NCC). When transmitting uplink data of the first network slice, the terminal device may derive a security key based on the NCC. For example, the security key is used to perform security protection on user uplink data of the first network slice, or the security key is used to perform integrity protection on the uplink data transmitted by the terminal device, or the security key is used by the terminal device to receive the downlink data for the first network slice based on the security key.

In some examples, after receiving the first notification message, the terminal device corresponding to the first network slice may perform communication based on information in the first notification message. For example, the terminal device may perform, based on the first notification information, communication access, a session, uplink data transmission, and downlink data receiving that are based on the first network slice.

In some embodiments, the first category is the first PDU session type, and the access network device may further send the second notification message to the terminal device, where the second notification message includes an area identifier of the first PDU session type, an identifier of the first PDU session type, a paging cycle of the first PDU session type, a paging area of the first PDU session type, and security information of the first PDU session type.

Definitions and functions of the pieces of information included in the second notification message are similar to those of the first notification message. For example, the identifier of the first PUD session type may be used to indicate that the terminal device can perform data transmission of the first access technology.

In some examples, the identifier of the first PDU session type may be used to indicate that the terminal device can perform data transmission of the first PDU session type.

In some examples, the area identifier of the first PDU session type may be, for example, a cell list supporting the first network slice, or an area identifier supporting the first PDU session type. The terminal device performs the data transmission of the first PDU session type in an area supported by the first PDU session type.

In some examples, the paging area of the first PDU session type may be, for example, a paging cell list supporting the first PDU session type, or a paging area identifier supporting the first PDU session type. The paging area may be the same as or different from the area identifier of the first PDU session type. The terminal device receives a paging command for the first PDU session type or receives downlink data for the first PDU session type in a paging area supported by the first PDU session type.

In some examples, the paging cycle of the first PDU session type is used by the terminal device to receive the paging command for the first PDU session type or receive the downlink data for the first PDU session type in the paging cycle.

In some examples, the security information of the first PDU session type may be, for example, a next hop chaining counter (NCC). When transmitting uplink data of the first PDU session type, the terminal device may derive a security key based on the NCC. For example, the security key is used to perform security protection on user uplink data of the first PDU session type, or the security key is used to perform integrity protection on the uplink data transmitted by the terminal device, or the security key is used by the terminal device to receive the downlink data for the first PDU session type based on the security key.

In some examples, after receiving the first notification message, the terminal device corresponding to the first PDU session type may perform communication based on information in the first notification message. For example, the terminal device may perform, based on the first notification information, communication access, a session, uplink data transmission, and downlink data receiving that are based on the first PDU session type.

In some embodiments, the first category is the first access technology, and the access network device may further send the third notification message to the terminal device, where the third notification message includes an area identifier of the first access technology, an identifier of the first access technology, a paging cycle of the first access technology, a paging area of the first access technology, and security information of the first access technology.

Definitions and functions of the pieces of information included in the third notification message are similar to those of the pieces of information in the first notification message and the second notification message. For example, the identifier of the first access technology may be used to indicate that the terminal device can perform data transmission of the first access technology.

In some examples, the area identifier of the first access technology may be, for example, a cell list supporting the first network slice, or an area identifier supporting the first access technology. The terminal device performs the data transmission of the first access technology in an area supported by the first access technology.

In some examples, the paging area of the first access technology may be, for example, a paging cell list supporting the first access technology, or a paging area identifier supporting the first access technology. The paging area may be the same as or different from the area identifier of the first access technology. The terminal device receives a paging command for the first access technology, or receives downlink data for the first access technology in a paging area supported by the first access technology.

In some examples, the paging cycle of the first access technology is used by the terminal device to receive the paging command for the first access technology or receive the downlink data for the first access technology in the paging cycle.

In some examples, the security information of the first access technology may be, for example, a next hop chaining counter (Next Hop Chaining Counter, NCC). When transmitting uplink data of the first access technology, the terminal device may derive a security key based on the NCC. For example, the security key is used to perform security protection on user uplink data of the first access technology, or the security key is used to perform integrity protection on the uplink data transmitted by the terminal device, or the security key is used by the terminal device to receive the downlink data for the first access technology based on the security key.

In some examples, after receiving the first notification message, the terminal device corresponding to the first access technology may perform communication based on information in the first notification message. For example, the terminal device may perform, based on the first notification information, communication access, a session, uplink data transmission, and downlink data receiving that are based on the first access technology.

The foregoing describes a communication process among the terminal device, the access network device, and the core network device. The following continues to describe a communication state of the terminal device in the foregoing communication process. In other words, a mode in which the terminal device can support the communication method in FIG. 2 is described.

In this embodiment of this application, to support large-scale access of terminal devices, the access network device does not need to perform the uplink transmission based on a granularity of the terminal device. To be specific, the access network device does not need to identify the terminal device corresponding to the uplink transmission, and only needs to distinguish the category corresponding to data for the uplink transmission. In this way, the data corresponding to the category is mapped to the communication connection corresponding to the category, and then the data is transmitted to the core network device through the communication connection corresponding to the category. In this way, signaling overheads can be reduced, and communication efficiency can be improved.

To support the communication method in this embodiment of this application, a first RRC mode is defined for the terminal device in this application. The first RRC mode is configured to include at least one of the following features: the terminal device stores a context corresponding to the first category; the terminal device stores an identifier of the first category; the terminal device is configured to transmit data corresponding to the first category; and the terminal device is configured to perform communication based on a paging cycle of the first category.

In this embodiment of this application, the first RRC mode is defined for the terminal device, to support category-based data transmission, thereby improving management efficiency.

Optionally, the terminal device may directly perform the category-based data transmission in the first RRC mode. In other words, data is transmitted based on the category, and there is no need to transmit the data based on the terminal device. In some embodiments, if different categories correspond to different access technologies, different categories use different air interface resources, and the access network device may distinguish, based on the air interface resource, the category corresponding to the uplink data. In some other embodiments, an identifier of the category may be added to a frame header of the uplink data, and the access network device may distinguish, based on the identifier of the category, the category corresponding to the uplink data. In some other embodiments, different categories may correspond to different reference signal sequences, and the category corresponding to the uplink data may be distinguished based on the reference signal sequence. In some other embodiments, an identifier, for example, a cell radio network temporary identifier (C-RNTI), of the terminal device may be added to the frame header of the uplink data, and the access network device may distinguish, based on the identifier of the terminal device, the terminal device corresponding to the uplink data.

In some embodiments, the terminal device stores the identifier of the first category, and may send the data carrying the identifier of the first category to the access network device, so that the access network device distinguishes different categories.

In some embodiments, the terminal device may enter a sleep mode or a wakeup mode based on a category level paging cycle. For example, a paging occasion and a paging frame may be calculated based on an identifier of the category.

The first RRC mode may be an improvement made in an RRC mode in the prior art. For example, the first RRC mode may be an inactive mode. The improved inactive mode may further include complete access stratum (AS) configuration information. The AS configuration information may include, for example, UE security information, UE capability signaling, quality of service (QoS) information, and bearer configuration information.

In addition, the access network device that supports the first RRC mode may further send a broadcast message, to indicate whether a cell supports a category-based communication connection. In some embodiments, the access network device may broadcast, in the cell, a single bit to indicate whether the cell supports category-based communication. For example, a value 1 indicates that the cell supports the category-based communication, and a value 0 indicates that the cell does not support the category-based communication. The access network device may further broadcast a category supported by the cell, for example, a broadcast category identifier, a broadcast category identifier list, or a broadcast category bit list. For example, a first bit identifies the first category. When the first bit is set to 1, it indicates that the first category is supported. When the first bit is set to 0, it indicates that the first category is not supported.

In some other embodiments, the access network device may broadcast a cell list, and indicate that all cells in the cell list support the category-based communication connection. In another embodiment, the access network device may broadcast an area identifier, and indicate that all cells corresponding to the area identifier support the category-based communication connection.

Optionally, the first RRC mode may be used as an independent RRC mode. For example, the first RRC mode may be referred to as an RRC enhanced idle (E-idle) mode, or may be referred to as an enhanced idle mode for short. The RRC enhanced idle mode may further include the following features: public land mobile network (PLMN) selection, broadcast system information, and cell reselection mobility. The PLMN selection is used by the terminal device to select or reselect a cell that supports a PLMN. The broadcast system information is used by the terminal device to perform initial access, cell reselection, layer 1 parameter configuration, layer 2 parameter configuration, layer 3 parameter configuration, and the like. The cell reselection mobility is used by the terminal device to perform the cell reselection.

Figure 5:
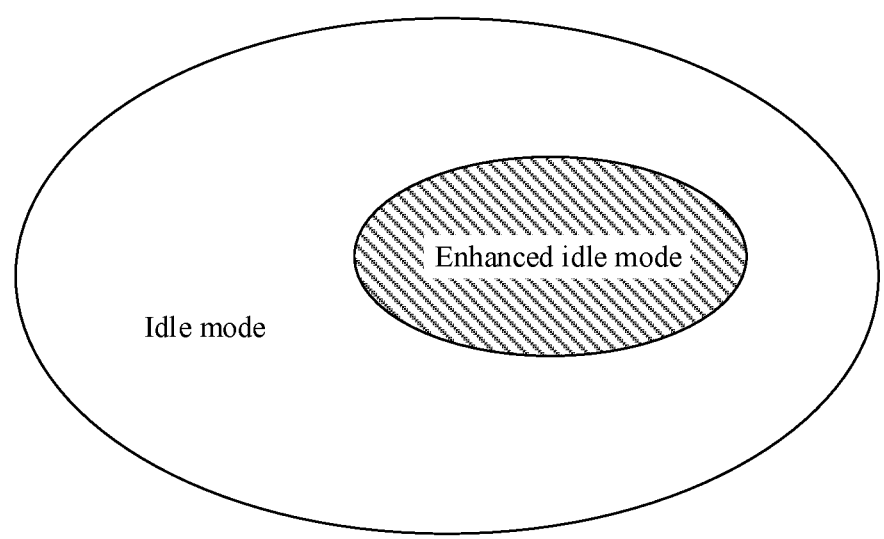
FIG. 5 is a schematic diagram of an RRC mode of a terminal device according to an embodiment of this application.

In an example, FIG. 5 is a schematic diagram of an RRC mode of a terminal device according to an embodiment of this application. As shown in FIG. 5, when an enhanced idle mode is used as an independent RRC mode, the enhanced idle mode may be applied to a communication process as a sub mode of an RRC idle mode in the RRC mode. The RRC idle mode may also be referred to as an idle mode for short.

Alternatively, the enhanced idle mode may be applied to communication as a mode parallel to the idle mode.

Optionally, if the terminal device performs transmission based on a first category in the first RRC mode, the method in this embodiment of this application may further include: An access network device sends first RRC mode indication information to a terminal device, and correspondingly, the terminal device receives the first RRC mode indication information from the access network device. The first RRC mode indication information is used to indicate the terminal device to enter the first RRC mode.

Figure 6:
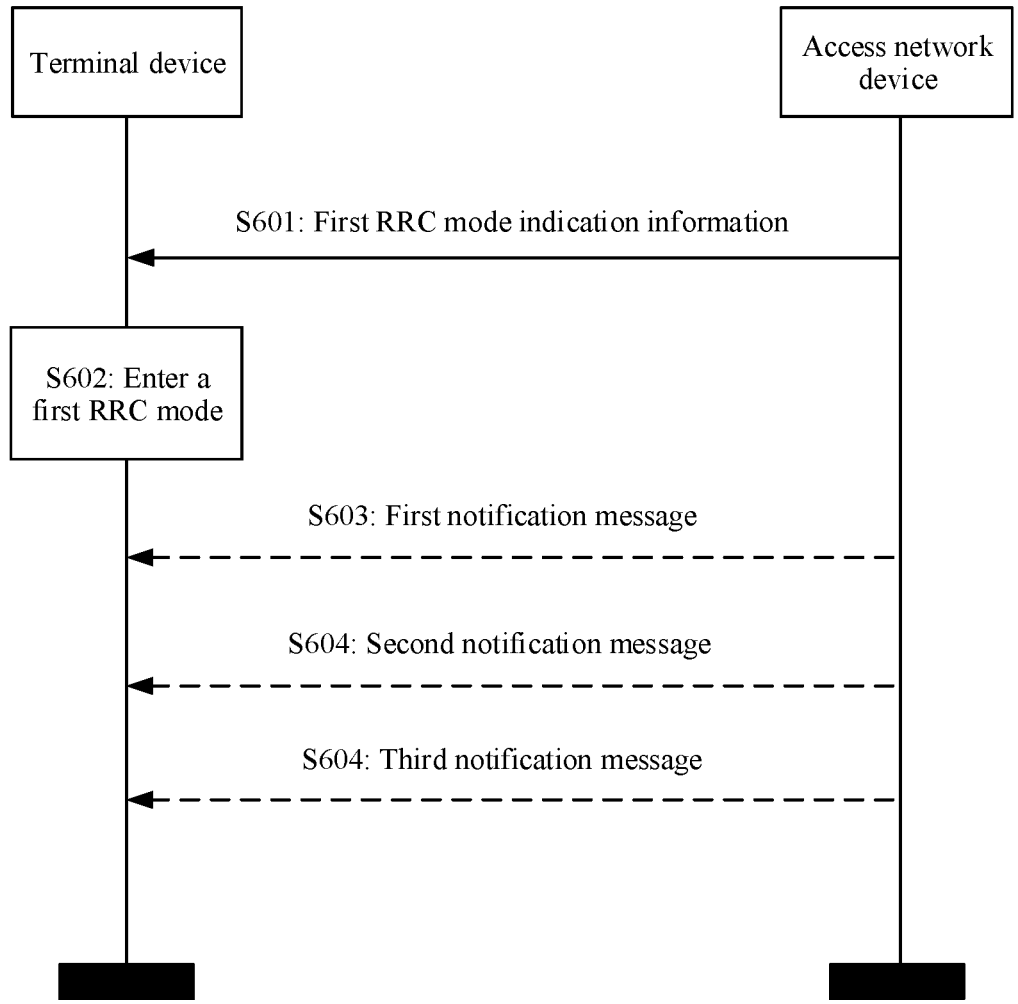
FIG. 6 is a schematic flowchart of a terminal device according to another embodiment of this application.

FIG. 6 is a schematic flowchart of a communication method according to another embodiment of this application. The method is performed by a terminal device. As shown in FIG. 6, the method includes the following steps:

S601: The terminal device receives first RRC mode indication information sent by an access network device, where the first RRC mode indication information is used to indicate the terminal device to enter a first RRC mode, and the first RRC mode includes at least one of the following features: the terminal device stores a context corresponding to a first category; the terminal device stores an identifier of the first category; the terminal device is configured to transmit data corresponding to the first category; and the terminal device is configured to perform communication based on a paging cycle of the first category.

The first RRC mode indication information may be, for example, enhanced idle mode indication (E-idle indication) information. Optionally, the first RRC mode indication information may be separately indicated, or the first RRC mode indication information may be added to a cause value. The foregoing first RRC mode indication information may be carried in any message, for example, may be carried in an air interface message, may be carried in an RRC connection release message, or may be carried in the first notification message, the second notification message, or the third notification message. Optionally, when sending the first RRC mode indication information, the access network device may further send, to the terminal device, configuration information of the category to which the terminal device belongs. The terminal device may store the configuration information, to be used in data transmission or another related operation in the first RRC mode. The configuration information may be information included in a notification message sent by the access network device to the terminal device. For example, the configuration information may be an area identifier of a network slice, an identifier of the network slice, a paging cycle of the network slice, a paging area of the network slice, security information of the network slice, and the like that are included in the first notification message. Alternatively, the configuration information may be information included in the second notification message or the third notification message.

S602: The terminal device enters the first RRC mode based on the first RRC mode indication information.

In this embodiment of this application, the terminal device is configured to be in the first RRC mode, to support category-based data transmission, thereby improving management efficiency.

In some examples, the first category is a first network slice, a first packet data unit PDU session type, or a first access technology.

In this embodiment of this application, a network access and communication process of the terminal device may be managed based on the network slice, the PDU session type, or the access technology, to avoid separately setting up a communication connection between an access network device and a core network device for each terminal device, thereby reducing related signaling overheads and improving management efficiency.

In some examples, the method further includes: sending, by the terminal device, uplink data to the access network device, where the uplink data includes the identifier of the first category.

In this embodiment of this application, the terminal device adds the identifier of the first category to the uplink data, so that the access network device transmits the uplink data based on the first category, thereby improving communication efficiency.

In some examples, the method further includes: receiving, by the terminal device, downlink data from the access network device, where the downlink data includes the identifier of the first category.

In this embodiment of this application, the downlink data received by the terminal device includes the identifier of the first category, so that the terminal device identifies the category to which the downlink data belongs. This provides a flexible data transmission method.

In some embodiments, the downlink data is carried in a broadcast message.

In some examples, the terminal device receives, by using the broadcast message, the downlink data corresponding to the first category. This provides a flexible data transmission method.

In some embodiments, the downlink data is carried in a paging message.

In this embodiment of this application, the terminal device receives, by using the paging message, the downlink data corresponding to the first category. This provides a flexible data transmission method.

In some examples, the first category is the first network slice, and the method further includes the following step: S603: The terminal device receives a first notification message sent by the access network device, where the first notification message includes at least one of the following information: an area identifier of the first network slice, an identifier of the first network slice, a paging cycle of the first network slice, a paging area of the first network slice, and security information of the first network slice.

In this embodiment of this application, when the first category is the first network slice, the terminal device receives the first notification message from the access network device, and the first notification message is used to indicate configuration information related to the first network slice, so that the terminal device performs first category-based communication, thereby improving communication management efficiency.

In some examples, the first category is the first PDU session type, and the method further includes the following step: S604: The terminal device receives a second notification message sent by the access network device, where the second notification message includes an area identifier of the first PDU session type, an identifier of the first PDU session type, a paging cycle of the first PDU session type, a paging area of the first PDU session type, and security information of the first PDU session type.

In this embodiment of this application, when the first category is the first PDU session type, the terminal device receives the first notification message from the access network device, and the first notification message is used to indicate configuration information related to the first PDU session type, so that the terminal device performs first category-based communication, thereby improving communication management efficiency.

In some examples, that the first category is the first access technology, and the method further includes the following step: S605: The terminal device receives a third notification message sent by the access network device, where the third notification message includes an area identifier of the first access technology, an identifier of the first access technology, a paging cycle of the first access technology, a paging area of the first access technology, and security information of the first access technology.

In this embodiment of this application, when the first category is the first access technology, the terminal device receives the first notification message from the access network device, and the first notification message is used to indicate configuration information related to the first access technology, so that the terminal device performs first category-based communication, thereby improving communication management efficiency.

Figure 7:
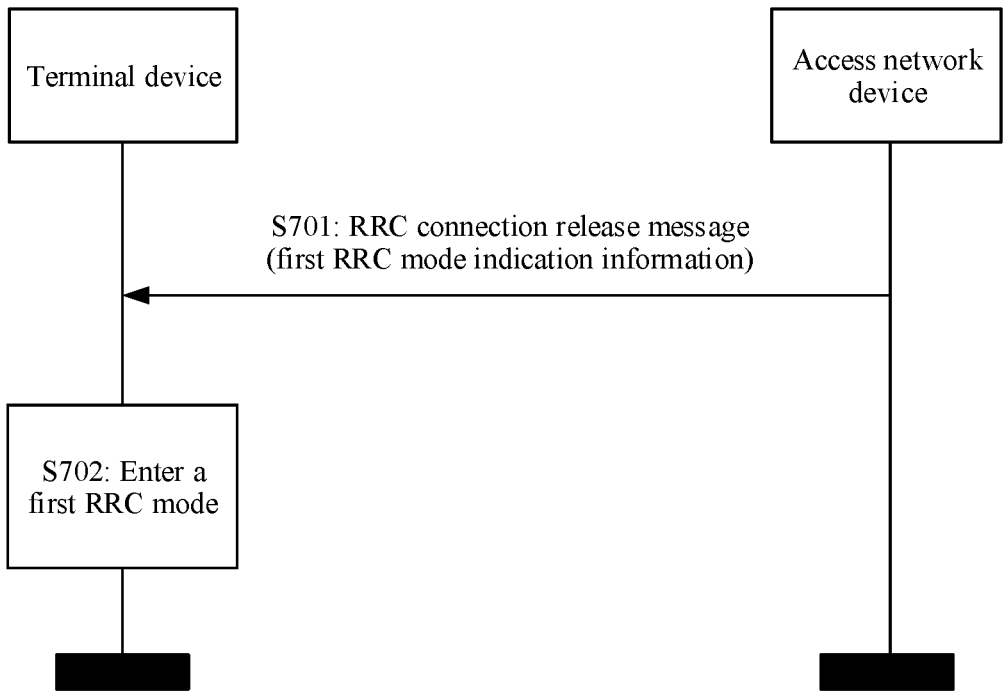
FIG. 7 is a specific example diagram of a communication method according to another embodiment of this application.

FIG. 7 shows a specific example of a communication method according to another embodiment of this application. First RRC mode indication information in FIG. 7 may be carried in an RRC connection release message. The method in FIG. 7 includes the following steps:

S701: An access network device sends the RRC connection release message to a terminal device, and correspondingly, the terminal device receives the RRC connection release message from the access network device, where the RRC connection release message includes the first RRC mode indication information.

S702: The terminal device enters a first RRC mode.

For example, after receiving the RRC connection release message, the terminal device may send, to a higher layer, reminder information about entering the first RRC mode, and enter the first RRC mode. Optionally, after receiving the RRC connection release message, the terminal device may further perform an operation of leaving an RRC connected mode.

The foregoing describes the RRC mode of the terminal device in the communication process in the embodiments of this application. The following continues to describe a solution for switching between RRC modes of the terminal device.

Figure 8:
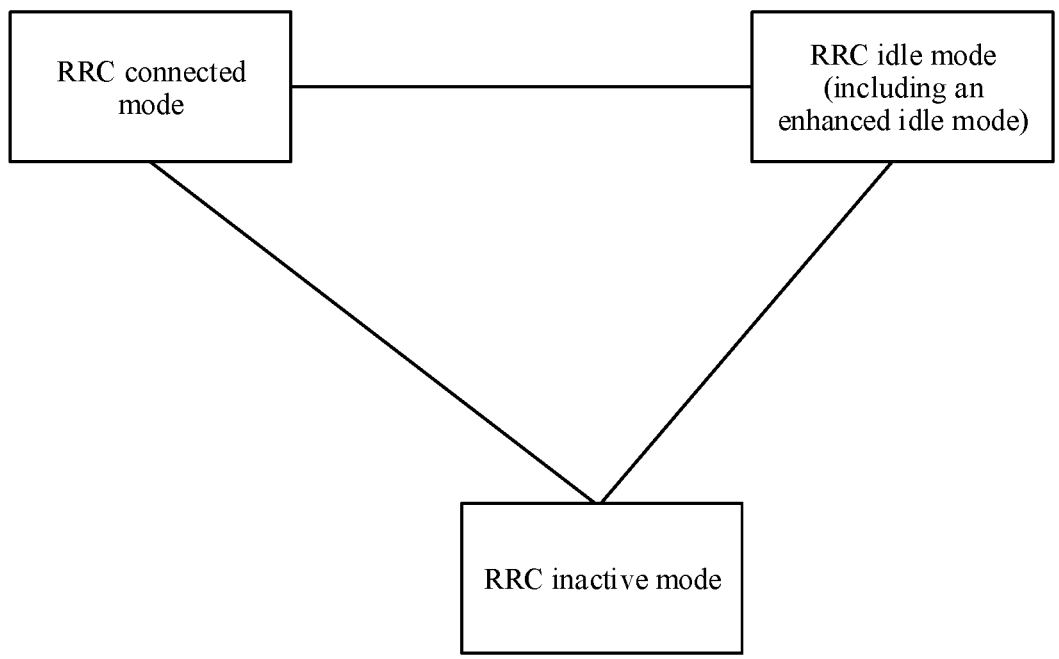
FIG. 8 is a schematic diagram of an RRC mode switching method for a terminal device according to an embodiment of this application.

In an example, FIG. 8 is a schematic diagram of an RRC mode switching method for a terminal device according to an embodiment of this application. The terminal device in FIG. 8 may include the following RRC modes: an RRC connected mode, an RRC inactive mode, and an RRC idle mode. A first RRC mode may be an enhanced idle mode, and exists as a sub mode of the RRC idle mode.

As shown in FIG. 8, the terminal device may switch between the plurality of RRC modes. The terminal device may switch the RRC modes in a plurality of manners. For example, switching may be performed based on RRC signaling or internal signaling of the terminal device, or switching may be performed based on other signaling. This is not limited in this embodiment of this application.

Optionally, when the terminal device needs to switch from the first RRC mode to the RRC connected mode, the terminal device may perform the switching based on an RRC connection setup message. For example, the terminal device may send an RRC connection setup request message to an access network device, and then the terminal device receives the RRC connection setup message sent by the access network device. After receiving the RRC connection setup message, the terminal device may switch to the RRC connected mode.

Optionally, when the terminal device needs to switch from the RRC connected mode to the first RRC mode, the terminal device may perform the switching based on an RRC connection release message. For example, the terminal device may receive the RRC connection release message sent by the access network device. The RRC connection release message may include information indicating to switch to the first RRC mode. After receiving the RRC connection release message, the terminal device may switch to the first RRC mode.

Optionally, when the terminal device needs to switch from the RRC idle mode to the RRC connected mode, the terminal device may perform switching based on an RRC connection setup message. For example, the terminal device may send an RRC connection setup request message to the access network device, and then the terminal device receives the RRC connection setup message sent by the access network device. After receiving the RRC connection setup message, the terminal device may switch to the RRC connected mode.

Optionally, when the terminal device needs to switch from the RRC connected mode to the RRC idle mode, the terminal device may perform switching based on an RRC connection release message. For example, the terminal device may receive the RRC connection release message sent by the access network device. The RRC connection release message may include information indicating to switch to the RRC idle mode. After receiving the RRC connection release message, the terminal device may switch to the RRC idle mode.

Optionally, when the terminal device needs to switch from the RRC inactive mode to the RRC connected mode, the terminal device may perform switching based on an RRC connection resume message. For example, the terminal device may send an RRC connection resume request message to the access network device, and then receive the RRC connection resume message sent by the access network device. After receiving the RRC connection resume message, the terminal device may switch to the RRC connected mode.

Optionally, when the terminal device needs to switch from the RRC connected mode to the RRC inactive mode, the terminal device may perform switching based on an RRC connection release message. For example, the terminal device may receive the RRC connection release message sent by the access network device, and the RRC connection release message may include information indicating to switch to the RRC inactive mode. After receiving the RRC connection release message, the terminal device may switch to the RRC inactive mode.

Optionally, when the terminal device needs to switch from the RRC inactive mode to the RRC idle mode, the terminal device may perform switching based on an RRC connection release message. For example, when the terminal device fails to switch from the RRC inactive mode to the RRC connected mode, or the access network device determines to switch the terminal device from the RRC inactive mode to the RRC idle mode, the access network device may send the RRC connection release message to the terminal device, and the RRC connection release message may include information indicating to switch to the RRC idle mode. After receiving the RRC connection release message, the terminal device may fall back to the RRC idle mode.

Optionally, the terminal device may send RRC connection setup request information based on security information corresponding to the first category, to implement RRC mode switching of the terminal device. For example, if the first category is a first network slice, the security information may be, for example, an NCC.

Figure 9:
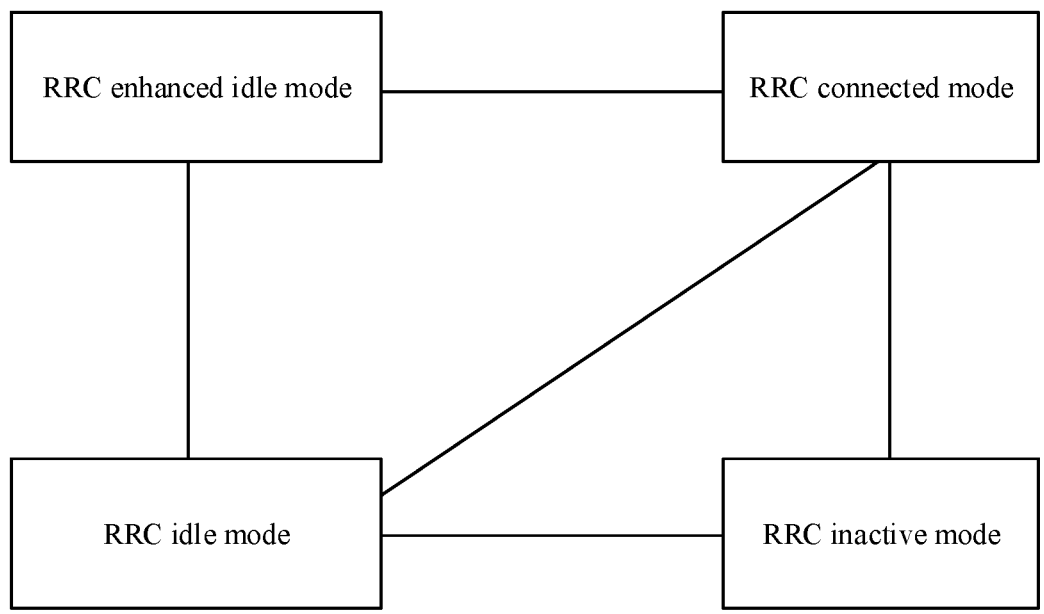
FIG. 9 is a schematic diagram of a method for switching an RRC mode of a terminal device according to another embodiment of this application.

In an example, FIG. 9 is a schematic diagram of an RRC mode switching method for a terminal device according to another embodiment of this application. In FIG. 9, a first RRC mode exists as a separate RRC connected mode, that is, the enhanced idle mode described above. The terminal device in FIG. 9 may include the following RRC modes: an RRC connected mode, an RRC inactive mode, an RRC idle mode, and an enhanced idle mode.

As shown in FIG. 9, the terminal device may switch between the plurality of RRC modes. The terminal device may switch the RRC modes in a plurality of manners. For example, switching may be performed based on RRC signaling or internal signaling of the terminal device, or switching may be performed based on other signaling. This is not limited in this embodiment of this application.

Optionally, when the terminal device needs to switch from the enhanced idle mode to the RRC connected mode, the terminal device may perform switching based on an RRC connection setup message. For example, the terminal device may send an RRC connection setup request message to an access network device, and then the terminal device receives the RRC connection setup message sent by the access network device. After receiving the RRC connection setup message, the terminal device may switch to the RRC connected mode.

Optionally, when the terminal device needs to switch from the RRC connected mode to the enhanced idle mode, the terminal device may perform switching based on an RRC connection release message. For example, when the terminal device fails to switch from the RRC inactive mode to the RRC connected mode, or the access network device determines to switch the terminal device from the RRC inactive mode to the RRC idle mode, the access network device may send the RRC connection release message to the terminal device, and the RRC connection release message may include information indicating to switch to the RRC idle mode. After receiving the RRC connection release message, the terminal device may fall back to the RRC idle mode.

Optionally, when switching between the RRC idle mode and the enhanced idle mode, the terminal device may perform switching by using internal signaling of the terminal device. In some embodiments, the terminal device can switch only from the enhanced RRC idle mode to the RRC idle mode, that is, can perform only unidirectional switching. In some other embodiments, the terminal device can switch from the RRC enhanced idle mode to the RRC idle mode, and can also switch from the RRC idle mode to the RRC enhanced idle mode.

Optionally, when the terminal device needs to switch from the RRC idle mode to the RRC connected mode, the terminal device may perform the switching based on an RRC connection setup message. For example, the terminal device may send an RRC connection setup request message to the access network device, and then the terminal device receives the RRC connection setup message sent by the access network device. After receiving the RRC connection setup message, the terminal device may switch to the RRC connected mode.

Optionally, when the terminal device needs to switch from the RRC connected mode to the RRC idle mode, the terminal device may perform switching based on an RRC connection release message. For example, the terminal device may receive the RRC connection release message sent by the access network device. The RRC connection release message may include information indicating to switch to the RRC idle mode. After receiving the RRC connection release message, the terminal device may switch to the RRC idle mode.

Optionally, when the terminal device needs to switch from the RRC inactive mode to the RRC connected mode, the terminal device may perform switching based on an RRC connection resume message. For example, the terminal device may send an RRC connection resume request message to the access network device, and then receive the RRC connection resume message sent by the access network device. After receiving the RRC connection resume message, the terminal device may switch to the RRC connected mode.

Optionally, when the terminal device needs to switch from the RRC connected mode to the RRC inactive mode, the terminal device may perform switching based on an RRC connection release message. For example, the terminal device may receive the RRC connection release message sent by the access network device. The RRC connection release message may include information indicating to switch to the RRC inactive mode. After receiving the RRC connection release message, the terminal device may switch to the RRC inactive mode.

Optionally, when the terminal device needs to switch from the RRC inactive mode to the RRC idle mode, the terminal device may perform switching by using internal signaling. For example, when the terminal device fails to switch from the RRC inactive mode to the RRC connected mode, the terminal device may fall back to the RRC idle mode.

The foregoing describes in detail the communication method in the embodiments of this application with reference to FIG. 1 to FIG. 9. The following describes in detail devices in the embodiments of this application with reference to FIG. 10 to FIG. 15.

Figure 10:
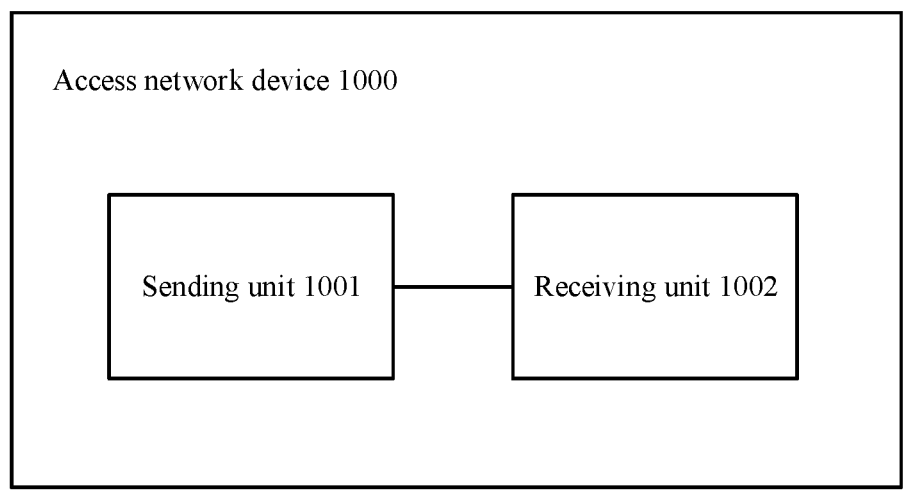
FIG. 10 is a schematic structural diagram of an access network device according to an embodiment of this application.

FIG. 10 is a schematic block diagram of an access network device 1000 according to an embodiment of this application. It should be understood that the access network device 1000 can perform the steps performed by the access network device in the embodiments of this application. To avoid repetition, details are not described herein. The access network device 1000 includes a sending unit 1001 and a receiving unit 1002.

The sending unit 1001 is configured to send a request message to a core network device, the request message is used to request to set up a communication connection between the access network device and the core network device, and the communication connection corresponds to a first category. The receiving unit 1002 is configured to receive a response message sent by the core network device, and the response message includes transport layer information, for uplink transmission, that corresponds to the first category.

Figure 11:
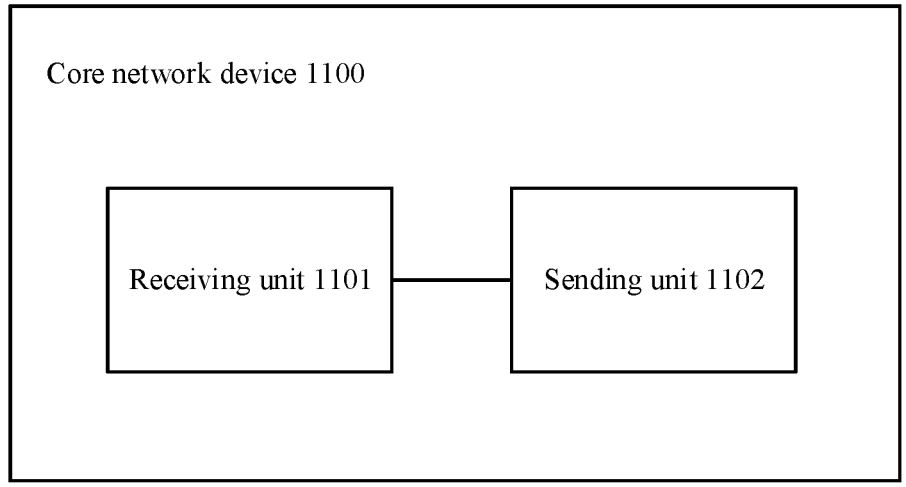
FIG. 11 is a schematic structural diagram of a core network device according to an embodiment of this application.

FIG. 11 is a schematic block diagram of a core network device 1100 according to an embodiment of this application. It should be understood that the core network device 1100 can perform the steps performed by the core network device in the embodiments of this application. To avoid repetition, details are not described herein. The core network device 1100 includes a receiving unit 1101 and a sending unit 1102.

The receiving unit 1101 is configured to receive a request message from an access network device, the request message is used to request to set up a communication connection between the access network device and the core network device, and the communication connection corresponds to a first category. The sending unit 1102 is configured to send a response message to the access network device, and the response message includes transport layer information, for uplink transmission, that corresponds to the first category.

Figure 12:
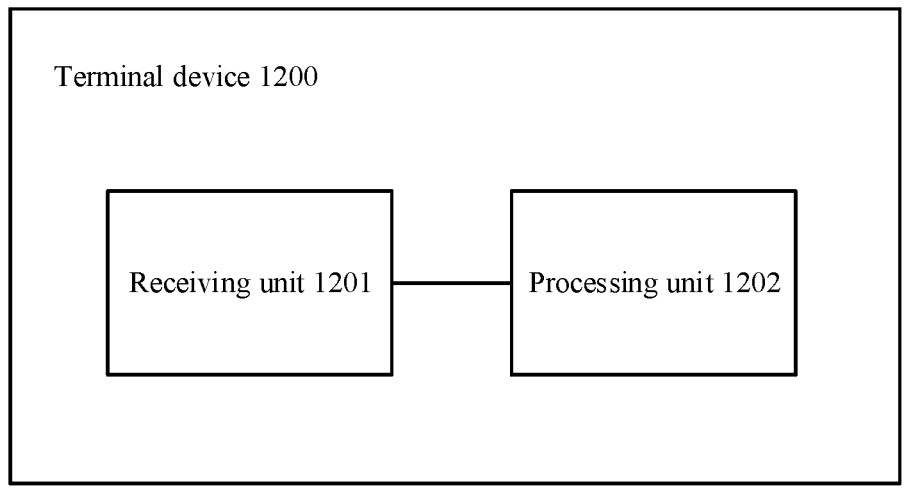
FIG. 12 is a schematic structural diagram of a terminal device according to an embodiment of this application.

FIG. 12 is a schematic block diagram of a terminal device 1200 according to an embodiment of this application. It should be understood that the terminal device 1200 can perform the steps performed by the terminal device in the embodiments of this application. To avoid repetition, details are not described herein. The terminal device 1200 includes a receiving unit 1201 and a processing unit 1202.

The receiving unit 1201 is configured to receive first RRC mode indication information sent by an access network device, the first RRC mode indication information is used to indicate the terminal device to enter a first RRC mode, and the first RRC mode includes at least one of the following features: the terminal device stores a context corresponding to a first category; the terminal device stores an identifier of the first category; the terminal device is configured to transmit data corresponding to the first category; and the terminal device is configured to perform communication based on a paging cycle of the first category.

The processing unit 1202 is configured to enable the terminal device to enter the first RRC mode based on the first RRC mode indication information.

Figure 13:
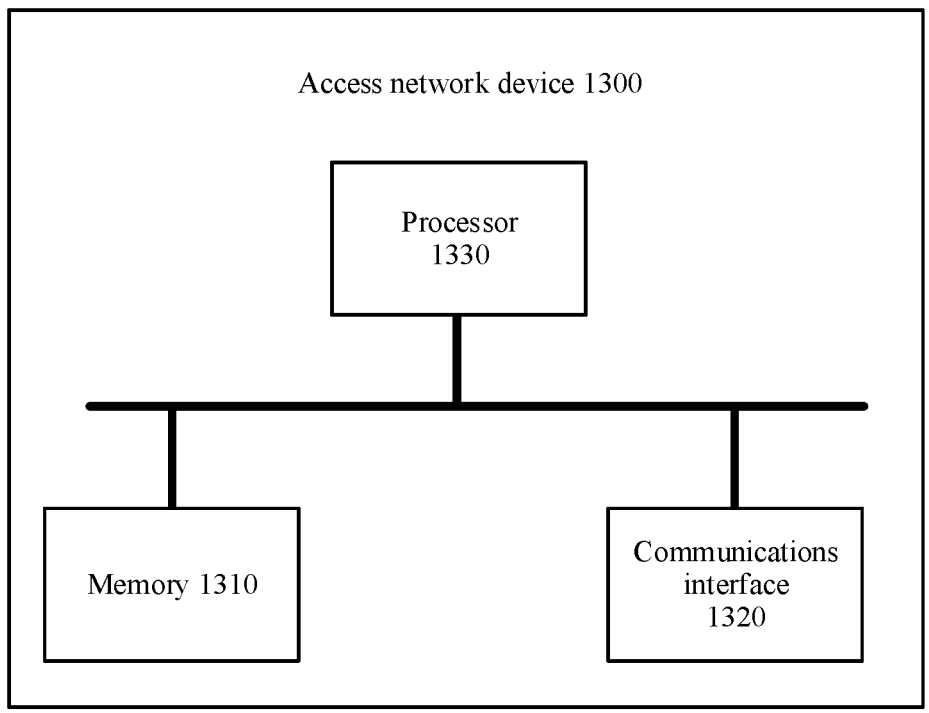
FIG. 13 is a schematic structural diagram of an access network device according to another embodiment of this application.

FIG. 13 is a schematic structural diagram of an access network device 1300 according to an embodiment of this application. The access network device 1300 can perform the steps performed by the access network device in the embodiments of this application. To avoid repetition, details are not described herein. As shown in FIG. 13, the access network device 1300 includes one or more processors 1330, one or more memories 1310, and one or more communications interfaces 1320. The processor 1330 is configured to control the communications interface 1320 to send and receive a signal. The memory 1310 is configured to store a computer program. The processor 1330 is configured to: invoke the computer program from the memory 1310 and run the computer program, so that the access network device 1300 performs the following operations:

sending a request message to a core network device, where the request message is used to request to set up a communication connection between the access network device and the core network device, and the communication connection corresponds to a first category; and receiving a response message sent by the core network device, where the response message includes transport layer information, for uplink transmission, that corresponds to the first category.

Optionally, the access network device 1300 in this embodiment of this application may not include the one or more memories 1310.

Figure 14:
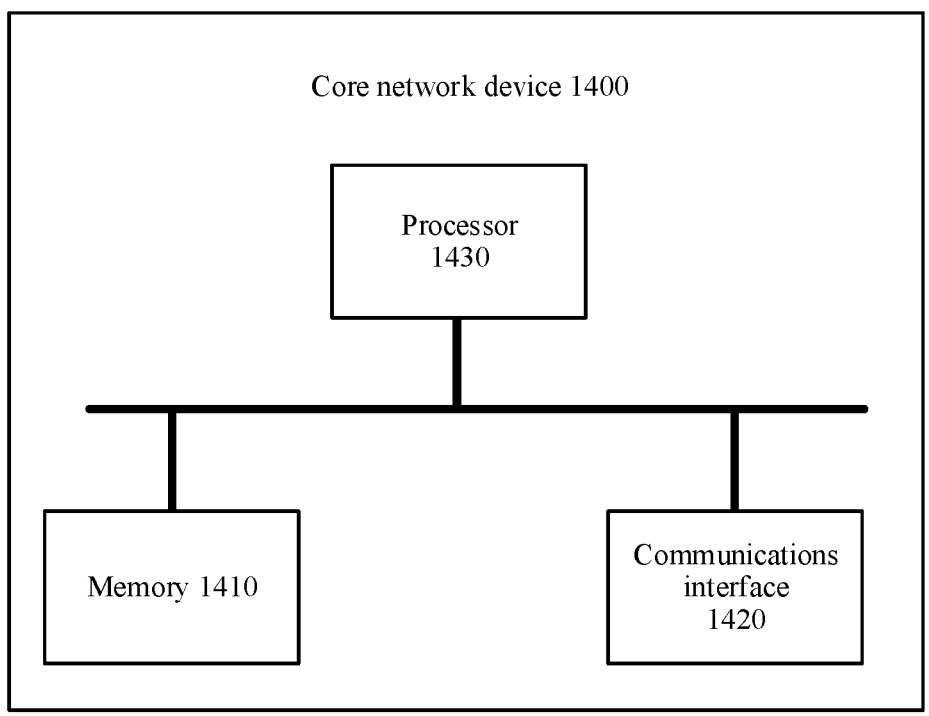
FIG. 14 is a schematic structural diagram of a core network device according to another embodiment of this application.

FIG. 14 is a schematic structural diagram of a core network device 1400 according to an embodiment of this application. The core network device 1400 can perform the steps performed by the core network device in the embodiments of this application. To avoid repetition, details are not described herein. As shown in FIG. 14, the core network device 1400 includes one or more processors 1430, one or more memories 1410, and one or more communications interfaces 1420. The processor 1430 is configured to control the communications interface 1420 to send and receive a signal. The memory 1410 is configured to store a computer program. The processor 1430 is configured to: invoke the computer program from the memory 1410 and run the computer program, so that the core network device 1400 performs the following operations:

receiving a request message from an access network device, where the request message is used to request to set up a communication connection between the access network device and the core network device, and the communication connection corresponds to a first category; and sending a response message to the access network device, where the response message includes transport layer information, for uplink transmission, that corresponds to the first category.

Optionally, the core network device 1400 in this embodiment of this application may not include the one or more memories 1410.

Figure 15:
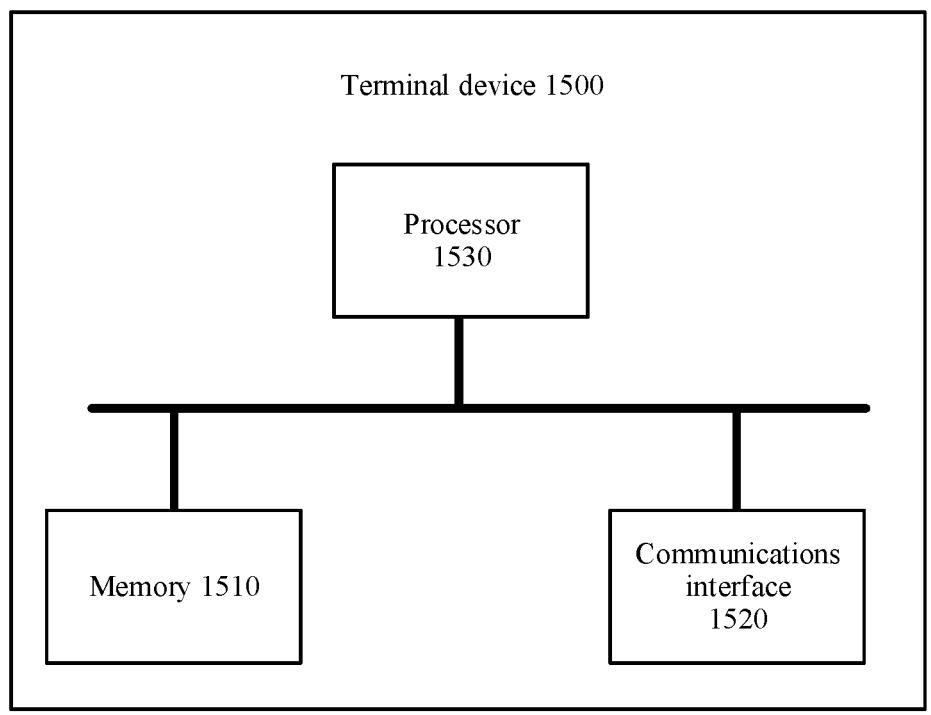
FIG. 15 is a schematic structural diagram of a terminal device according to an embodiment of this application.

FIG. 15 is a schematic structural diagram of a terminal device 1500 according to an embodiment of this application. The terminal device 1500 can perform the steps performed by the terminal device in the embodiments of this application. To avoid repetition, details are not described herein. As shown in FIG. 15, the terminal device 1500 includes one or more processors 1530, one or more memories 1510, and one or more communications interfaces 1520. The processor 1530 is configured to control the communications interface 1520 to send and receive a signal. The memory 1510 is configured to store a computer program. The processor 1530 is configured to: invoke the computer program from the memory 1510 and run the computer program, so that the terminal device 1500 performs the following operations:

receiving first RRC mode indication information sent by an access network device, where the first RRC mode indication information is used to indicate the terminal device to enter a first RRC mode, and the first RRC mode includes at least one of the following features: the terminal device stores a context corresponding to a first category; the terminal device stores an identifier of the first category; the terminal device is configured to transmit data corresponding to the first category; and the terminal device is configured to perform communication based on a paging cycle of the first category; and entering the first RRC mode based on the first RRC mode indication information.

Optionally, the terminal device 1500 in this embodiment of this application may not include the one or more memories 1510.

The foregoing describes the communication method between the access network device and the core network device according to the embodiments of this application with reference to FIG. 1 to FIG. 15. The following describes a communication method according to another embodiment of this application with reference to FIG. 16 to FIG. 21.

Figure 16:
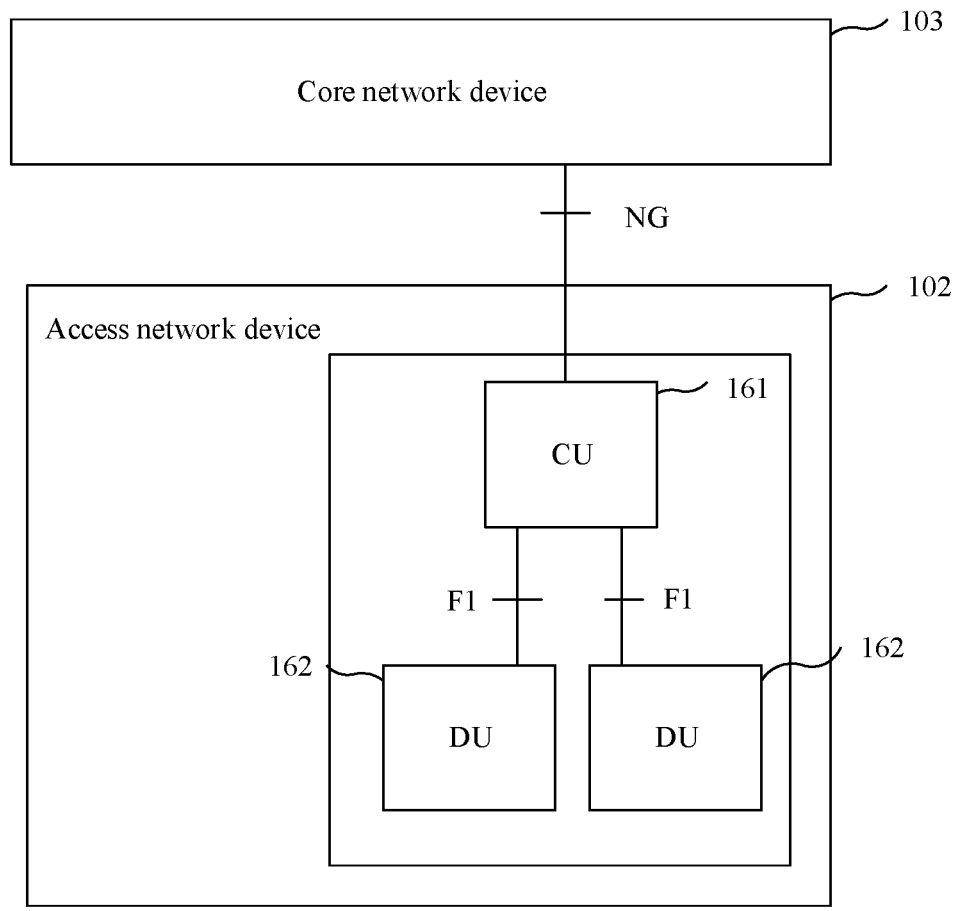
FIG. 16 is a schematic diagram of an application scenario according to another embodiment of this application.

FIG. 16 is a schematic diagram of an application scenario according to another embodiment of this application. As shown in FIG. 16, in a future network architecture, an access network device 103 may be divided into a centralized unit (CU) 161 and a distributed unit (DU) 162. The CU 161 and the DU 162 may be software-based or virtualized. Radio access network functions that need to be flexibly combined, for example, higher layer functions such as a service data adaptation protocol (SDAP) layer, a packet data convergence protocol (PDCP), and radio resource control (RRC), run in the CU 161. RAN functions that are closely related to hardware and have a relatively high real-time requirement, for example, bottom-layer functions such as a radio link control (RLC) layer, a physical layer (PHY), and a media access control (MAC) layer, run in the DU 162.

The CU 161 is connected to the DU 162 through a communications interface. The CU 161 is also connected to a core network device through a communications interface. In this embodiment of this application, the communications interface between the CU 161 and the DU 162 may be referred to as an F1 interface. The interface between the CU 161 and the core network device may be referred to as an NG interface. As shown in FIG. 16, one access network device may include one CU 161 and one or more DUs 162. The CU 161 is connected to the DU 162 through the F1 interface. One DU 162 can be connected to only one CU 161, and one CU 161 can be connected to one or more DUs 162.

Figure 17:
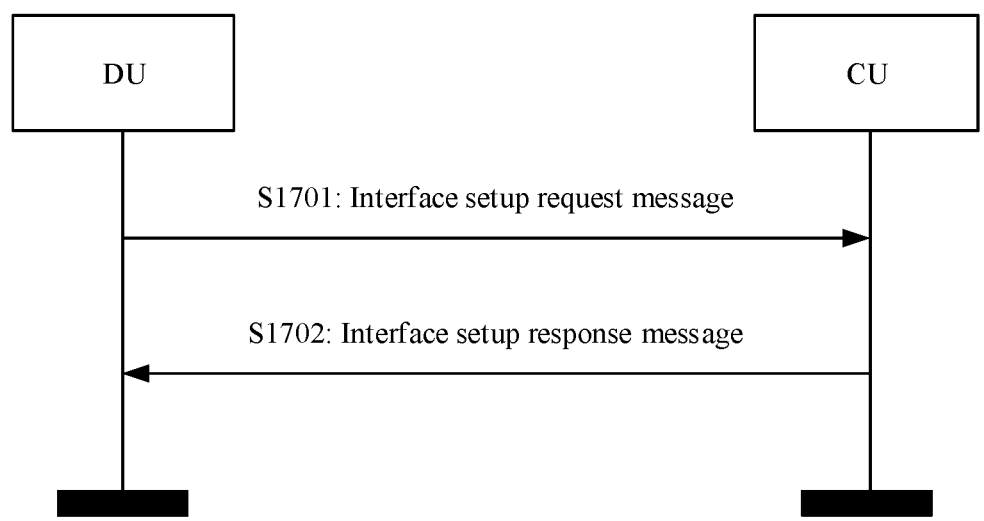
FIG. 17 is a schematic diagram of a communication method according to another embodiment of this application.

FIG. 17 is a schematic diagram of a communication method according to another embodiment of this application. The communication method in FIG. 17 may be applied to the environment in FIG. 16. The method in FIG. 17 includes the following steps:

S1701: A DU sends an interface (for example, F1) setup request message to a CU, and correspondingly, the CU receives the interface setup request message from the DU. The interface setup request message is used to request to set up a tunnel between the DU and the CU, and the tunnel corresponds to a first category.

The first category may be a first network slice, a first PDU session type, or a first access technology. A definition of the first category is the same as that in the foregoing description. For brevity, details are not described herein again.

The tunnel may be used to transmit uplink data or downlink data.

Optionally, the interface setup request message may include downlink tunnel transmission information corresponding to the first category. The downlink tunnel transmission information may include a tunnel identifier and a transport layer address, for downlink transmission, of the tunnel. The transport layer address for the downlink transmission may be an IP address of the DU. The CU may send the downlink data to the DU based on the transport layer address for the downlink transmission.

For example, the interface setup request message may include information listed in the following Table 5.

TABLE 5

>> PLMN identifier
>> TAI slice support list
>> Category identifier
>> Downlink tunnel transmission information S1702: The DU receives an interface (for example, F1) setup response message from the CU, and correspondingly, the CU sends the interface setup response message to the DU.

Optionally, the interface setup response message may include uplink tunnel transmission information corresponding to the first category. The uplink tunnel transmission information may include the tunnel identifier and a transport layer address, for uplink transmission, of the tunnel. The transport layer address for the uplink transmission may be an IP address of the CU.

For example, the interface setup response message may include information listed in the following Table 6.

TABLE 6

>> PLMN identifier
>> TAI slice support list
>> Category identifier
>> Uplink tunnel transmission information It should be noted that a plurality of categories may use a same tunnel. The category identifiers in Table 5 and Table 6 may be identifiers of one or more categories.

In this embodiment of this application, a network access and communication process of a terminal device can be managed based on the category, to avoid separately setting up a connection and a session between an access network device and a core network device for each terminal device, thereby reducing related signaling overheads between the CU and the DU and improving management efficiency.

Figure 18:
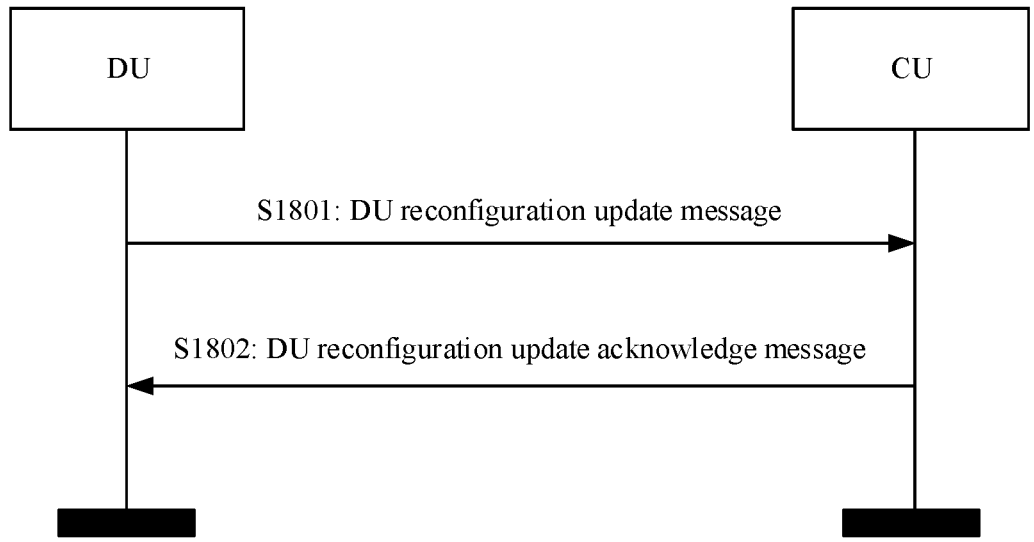
FIG. 18 is a schematic diagram of a communication method according to another embodiment of this application.

FIG. 18 is a schematic diagram of a communication method according to another embodiment of this application. The method in FIG. 18 includes the following steps:

S1801: A DU may send a DU reconfiguration update (DU configuration update) message to a CU, and correspondingly, the CU receives the DU reconfiguration update message from the DU, where the DU reconfiguration update message is used to indicate to update a category supported by the DU and a downlink tunnel transmission address corresponding to the category.

S1802: After sending the DU reconfiguration update message, the DU receives a DU reconfiguration update acknowledge (DU configuration update acknowledge) message from the CU, and correspondingly, after receiving the DU reconfiguration update message, the CU sends the DU reconfiguration update acknowledge message to the DU.

In this embodiment of this application, the DU and the CU may indicate, by using the DU reconfiguration update message, the updated category supported by the DU and the updated downlink tunnel transmission address corresponding to the category, thereby providing a flexible communication manner.

Figure 19:
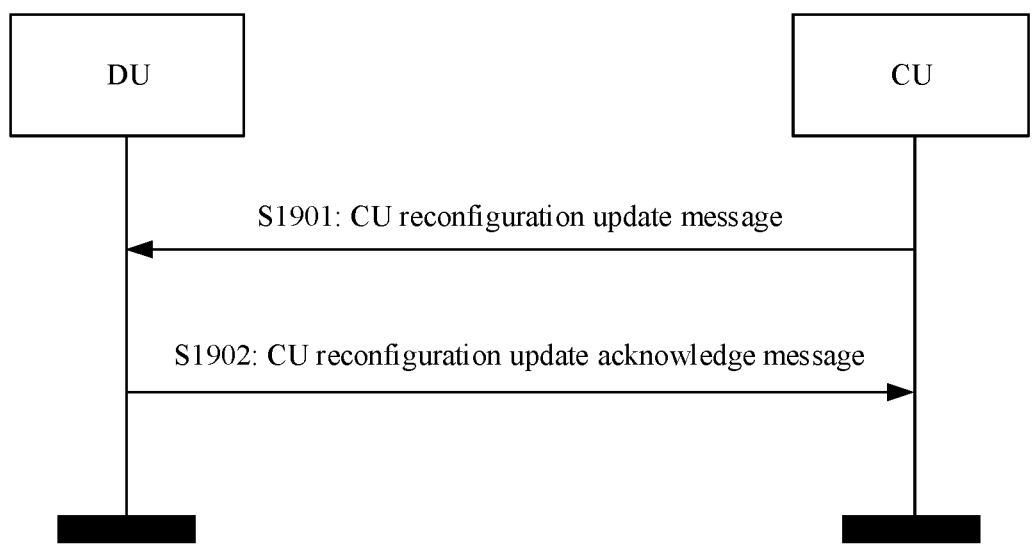
FIG. 19 is a schematic diagram of a communication method according to another embodiment of this application.

FIG. 19 is a schematic diagram of a communication method according to another embodiment of this application. The method in FIG. 19 includes the following steps:

S1901: A CU may send a CU reconfiguration update (CU configuration update) message to a DU, and correspondingly, the DU receives the CU reconfiguration update message from the CU, where the CU reconfiguration update message is used to indicate to update a category supported by the CU and an uplink tunnel transmission address corresponding to the category.

S1902: After sending the CU reconfiguration update message, the CU may receive a CU reconfiguration update acknowledge (CU configuration update acknowledge) message from the DU, and correspondingly, after receiving the CU reconfiguration update message, the DU may send the CU reconfiguration update acknowledge message to the CU.

In this embodiment of this application, the DU and the CU may indicate, by using the CU reconfiguration update message, the updated category supported by the CU and the updated downlink tunnel transmission address corresponding to the category, thereby providing a flexible communication manner.

Figure 20:
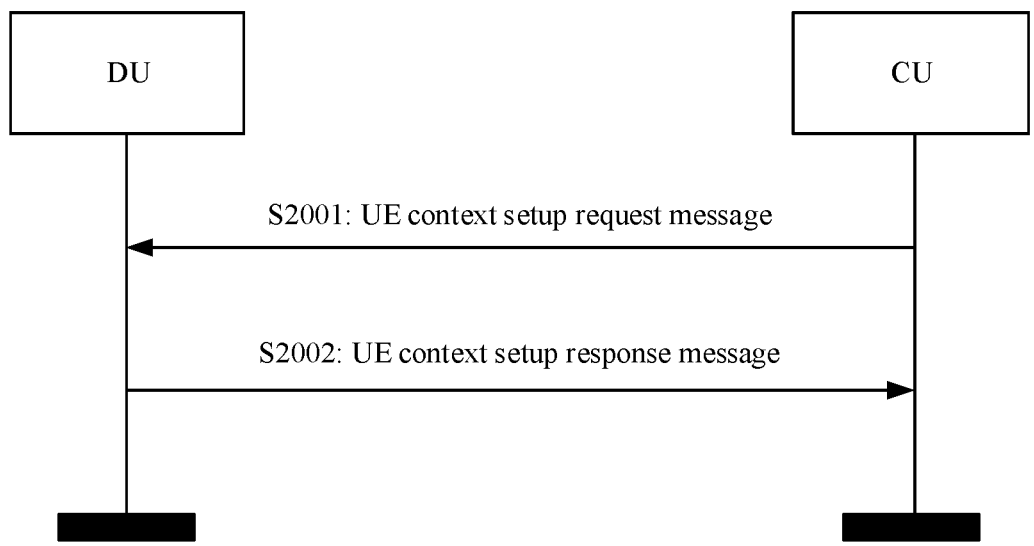
FIG. 20 is a schematic diagram of a communication method according to another embodiment of this application.

FIG. 20 is a schematic diagram of a communication method according to another embodiment of this application. The communication method in FIG. 20 may be applied to the scenario in FIG. 16. In the method in FIG. 20, a category-based tunnel may be set up between a CU and a DU in a process of setting up a PDU session by UE. The method in FIG. 20 includes the following steps:

2001: The CU sends a user equipment context setup request (UE context setup request) message to the DU, and correspondingly, the DU receives the user equipment context setup request message from the CU.

Optionally, the user equipment context setup request message may include uplink tunnel transmission information corresponding to a first category. The uplink tunnel transmission information may include a tunnel identifier and a transport layer address, for uplink transmission, of the tunnel. The transport layer address for the uplink transmission may be an IP address of the CU.

S2002: The CU receives a user equipment context setup response (UE context setup response) message from the DU, and correspondingly, the DU sends the user equipment context setup response message to the CU.

Optionally, the context setup response message may include downlink tunnel transmission information corresponding to the first category. The downlink tunnel transmission information may include the tunnel identifier and a transport layer address, for downlink transmission, of the tunnel. The transport layer address for the downlink transmission may be an IP address of the DU. The CU may send the downlink data to the DU based on the transport layer address for the downlink transmission.

In this embodiment of this application, a network access and communication process of a terminal device can be managed based on the category, to avoid separately setting up a connection and a session between an access network device and a core network device for each terminal device, thereby reducing related signaling overheads between the CU and the DU and improving management efficiency.

Figure 21:
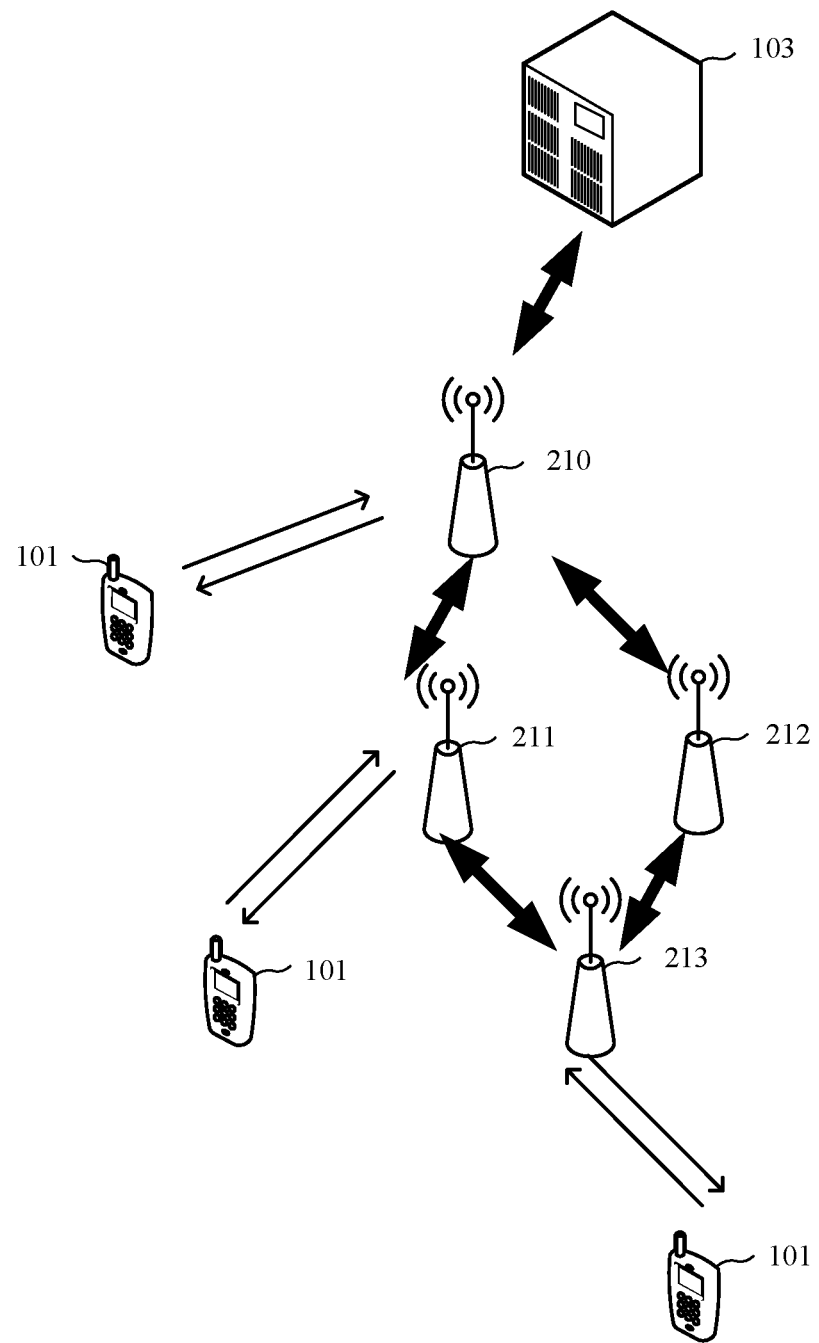
FIG. 21 is a schematic diagram of an application environment according to another embodiment of this application.

FIG. 21 is a schematic diagram of an application scenario according to another embodiment of this application. As shown in FIG. 21, in a future network architecture, a terminal device 101 may access a network by using a multi-hop relay structure. An integrated access and backhaul (IAB) node is defined as a network node that provides wireless access and wireless backhaul for the terminal device. An IAB donor node 210 is defined as a network node that is connected to a core network and provides wireless backhaul for the IAB node.

As shown in FIG. 21, in this scenario, a category-based communication connection may be set up between an IAB node 213 and an IAB node 211. A category-based communication connection may be set up between the IAB node 213 and an IAB node 212. A category-based communication connection may be set up between the IAB donor node 210 and the IAB node 211.

The foregoing category may enable each communication connection to serve one or more terminal devices. Optionally, the communication connection may be a tunnel set up between an upper-level IAB node and a lower-level IAB node. For example, the tunnel may be a tunnel set up between the IAB node 213 and the IAB node 211. The IAB node 211 is the upper-level IAB node, and the IAB node 213 is the lower-level IAB node. Alternatively, the IAB donor node 210 may be the upper-level IAB node, and the IAB node 212 may be the lower-level IAB node.

For example, the lower-level IAB node may send a tunnel setup request message to the upper-level IAB node, and correspondingly, the upper-level IAB node receives the tunnel setup request message from the lower-level IAB node. The tunnel setup request message is used to request to set up the tunnel between the lower-level IAB node and the upper-level IAB node, and the tunnel corresponds to a first category. After sending the tunnel setup request message, the lower-level IAB node receives a tunnel setup response message from the upper-level IAB node, and correspondingly, after receiving the tunnel setup request message, the upper-level IAB node sends the tunnel setup request response message to the lower-level IAB node.

Optionally, the tunnel setup request message may include transport layer information for downlink transmission. Optionally, the tunnel setup response message may include transport layer information for uplink transmission.

Optionally, the transport layer information for the uplink transmission may include a transport layer address and a tunnel identifier for the uplink transmission. For example, the transport layer address for the uplink transmission may usually be an IP address of the upper-level IAB node. The transport layer information for the downlink transmission may include a transport layer address and a tunnel identifier for the downlink transmission. For example, the transport layer address for the downlink transmission may usually be an IP address of the lower-level IAB node. The tunnel identifier may be a GTP tunnel endpoint identifier. The tunnel identifier is used for user plane transmission of the communication connection between the upper-level IAB node and the lower-level IAB node.

For example, the foregoing category may be obtained through division based on different network slices. That is, the first category may be a first network slice. In an example, the resource may be used to transmit uplink data and/or downlink data of a terminal device corresponding to the first network slice. For example, the first network slice corresponds to one piece of single network slice selection assistance information (S-NSSAI). Similarly, the foregoing category may alternatively be obtained through division based on a network slice type. For example, the foregoing first category corresponds to one SST (Slice/Service Type, slice service type).

Alternatively, the foregoing category may be obtained through division based on different PDU session types. Different PDU session types include but are not limited to the following: IPv4, IPv6, IPv4v6, an ethernet session, or an unstructured session. For example, the first category may be a first PDU session type. In an example, the communication connection may be used to transmit communication data corresponding to the first PDU session type. If a first terminal device performs communication by using the first PDU session type, the communication connection may be used to transmit uplink data and/or downlink data of the first terminal device.

Alternatively, the foregoing category may be obtained through division based on different access technologies. For example, the foregoing first category may be a first access technology. In an example, if a second terminal device accesses a communications network by using the first access technology, in this case, the communication connection may be used to transmit communication data of the second terminal device. Types of different access technologies include but are not limited to the following: cellular network access, non-3GPP access, 3GPP access, WLAN access, GERAN access, UTRAN access, or EUTRAN access.

Alternatively, the foregoing category may be obtained through division based on different bearers or logical channels, for example, based on a bearer or a logical channel priority, a bearer or a logical channel type (a guaranteed bit rate bearer, or a non-guaranteed bit rate bearer), or the like. In an example, the communication connection may be used to transmit uplink data and/or downlink data of a terminal device corresponding to a first bearer or a logical channel. For example, data that is of a plurality of terminal devices and that has a same or similar bearer type or logical channel type is transmitted through the communication connection, so that a same communication connection serves one or more terminal devices. The communication connection may be the tunnel set up between the upper-level IAB node and the lower-level IAB node.

Optionally, similar to the examples in FIG. 1 to FIG. 15, when sending the uplink data corresponding to the first category to the upper-level IAB node, the lower-level IAB node carries a user identifier corresponding to the uplink data, so that the upper-level IAB node can perform routing based on the user identifier, to facilitate the upper-level IAB node device to determine a user to which the uplink data belongs and select a next-hop IAB node. For example, the user identifier is a C-RNTI, a 5G-S-TMSI, a 5G-GUTI, or another user identifier allocated by the IAB donor node when the terminal device is connected to a network.

Optionally, similar to the examples in FIG. 1 to FIG. 15, when sending the downlink data corresponding to the first category to the lower-level IAB node, the upper-level IAB node carries a user identifier corresponding to the downlink data, so that the lower-level IAB node can perform routing based on the user identifier, to facilitate the lower-level IAB node device to determine a user to which the downlink data belongs and select a next-hop IAB node. For example, the user identifier is a C-RNTI, a 5G-S-TMSI, a 5G-GUTI, or another user identifier allocated by the IAB donor node when the terminal device is connected to a network.

In this embodiment of this application, a network access and communication process of the terminal device can be managed based on the category in the multi-hop relay structure access network, to avoid separately setting up a connection and a session between an access network device and a core network device for each terminal device, thereby reducing related signaling overheads and improving management efficiency.

The foregoing describes the communication method according to another embodiment of this application with reference to FIG. 16 to FIG. 21, and the following continues to describe apparatuses in the embodiments of this application with reference to FIG. 22 to FIG. 27.

Figure 22:
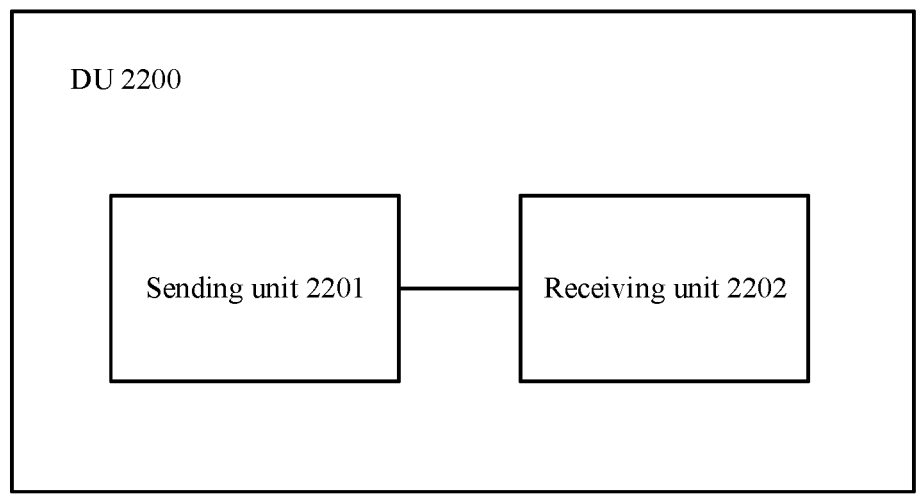
FIG. 22 is a schematic structural diagram of a distributed unit (DU) according to an embodiment of this application.

FIG. 22 is a schematic block diagram of a DU 2200 according to an embodiment of this application. It should be understood that the DU 2200 can perform the steps performed by the DU in the embodiments of this application. To avoid repetition, details are not described herein. The DU 2200 includes a sending unit 2201 and a receiving unit 2202.

The sending unit 2201 is configured to send an interface setup request message to a CU. The interface setup request message is used to request to set up a tunnel between the DU and the CU, and the tunnel corresponds to a first category. The receiving unit 2202 is configured to receive an interface setup response message from the CU.

Optionally, the interface setup response message may include uplink tunnel transmission information corresponding to the first category.

Optionally, the interface setup request message may include downlink tunnel transmission information corresponding to the first category.

Alternatively, the sending unit 2201 is configured to send a DU reconfiguration update message to the CU, and the DU reconfiguration update message is used to indicate to update a category supported by the DU and a downlink tunnel transmission address corresponding to the category. After sending the DU reconfiguration update message, the receiving unit 2202 is configured to receive a DU reconfiguration update acknowledge message from the CU.

Alternatively, the receiving unit 2202 is configured to receive a CU reconfiguration update message from the CU, and the CU reconfiguration update message is used to indicate to update a category supported by the CU. After receiving the CU reconfiguration update message, the sending unit 2201 is configured to send a CU reconfiguration update acknowledge message to the CU.

Alternatively, the receiving unit 2202 is configured to receive a user equipment context setup request message from the CU. The sending unit 2201 is configured to send a user equipment context setup response message to the CU. Optionally, the user equipment context setup request message may include the uplink tunnel transmission information corresponding to the first category. Optionally, the user equipment context setup response message may include the downlink tunnel transmission information corresponding to the first category.

Figure 23:
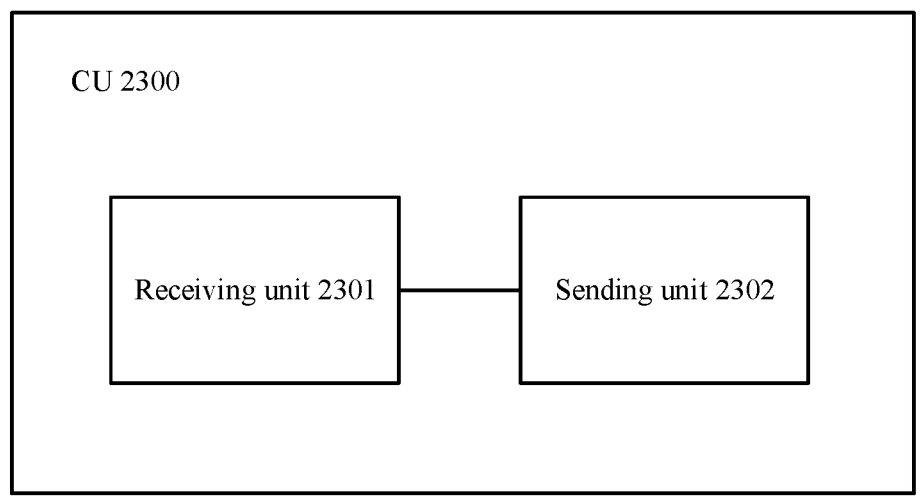
FIG. 23 is a schematic structural diagram of a centralized unit (CU) according to an embodiment of this application.

FIG. 23 is a schematic block diagram of a CU 2300 according to an embodiment of this application. It should be understood that the CU 2300 can perform the steps performed by the CU in the embodiments of this application. To avoid repetition, details are not described herein. The CU 2300 includes a receiving unit 2301 and a sending unit 2302.

The receiving unit 2301 is configured to receive an interface setup request message from a DU. The interface setup request message is used to request to set up a tunnel between the DU and the CU, and the tunnel corresponds to a first category. The sending unit 2302 is configured to send an interface setup response message to the DU.

Optionally, the interface setup response message may include uplink tunnel transmission information corresponding to the first category.

Optionally, the interface setup request message may include downlink tunnel transmission information corresponding to the first category.

Alternatively, the receiving unit 2301 is configured to receive a DU reconfiguration update message from the DU, and the DU reconfiguration update message is used to indicate to update a category supported by the DU and a downlink tunnel transmission address corresponding to the category. After receiving the DU reconfiguration update message, the sending unit 2302 is configured to send a DU reconfiguration update acknowledge message to the DU.

Alternatively, the sending unit 2302 is configured to send a CU reconfiguration update message to the CU, and the CU reconfiguration update message is used to indicate to update a category supported by the CU and an uplink tunnel transmission address corresponding to the category. After sending the CU reconfiguration update message, the receiving unit 2301 is configured to receive a CU reconfiguration update acknowledge message from the DU.

Alternatively, the sending unit 2302 is configured to send a user equipment context setup request message to the DU. The receiving unit 2301 is configured to receive a user equipment context setup response message from the DU. Optionally, the user equipment context setup request message may include the uplink tunnel transmission information corresponding to the first category. Optionally, the user equipment context setup response message may include the downlink tunnel transmission information corresponding to the first category.

Figure 24:
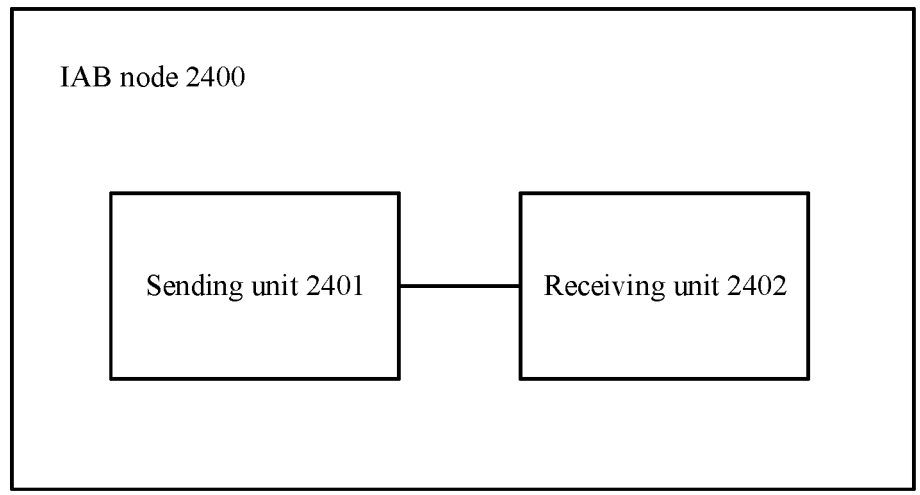
FIG. 24 is a schematic structural diagram of an integrated access and backhaul (IAB) node according to an embodiment of this application.

FIG. 24 is a schematic block diagram of an IAB node 2400 according to an embodiment of this application. It should be understood that the IAB node 2400 can perform the steps performed by the IAB node in the embodiments of this application. To avoid repetition, details are not described herein. For example, the IAB node 2400 performs steps or procedures performed by the IAB donor node 210 in FIG. 21, or may perform steps or procedures performed by the IAB node 211, the IAB node 212, or the IAB node 213 in FIG. 21. The IAB node 2400 may include a sending unit 2401 and a receiving unit 2402.

If the IAB node 2400 is a lower-level IAB node, the sending unit 2401 may be configured to send a tunnel setup request message to an upper-level IAB node. The tunnel setup request message is used to request to set up a tunnel between the lower-level IAB node and the upper-level IAB node, and the tunnel corresponds to a first category. After sending the tunnel setup request message, the receiving unit 2402 may be configured to receive a tunnel setup request response message from the upper-level IAB node.

Alternatively, if the IAB node 2400 is an upper-level IAB node, the receiving unit 2402 is configured to receive a tunnel setup request message from a lower-level IAB node. The tunnel setup request message is used to request to set up a tunnel between the lower-level IAB node and the upper-level IAB node, and the tunnel corresponds to a first category. After receiving the tunnel setup request message, the sending unit 2401 is configured to send a tunnel setup request response message to the lower-level IAB node.

Alternatively, if the IAB node 2400 is the lower-level IAB node, the sending unit 2401 may send corresponding uplink data to the upper-level IAB node. The receiving unit 2402 may receive downlink data corresponding to the first category from the upper-level IAB node.

Alternatively, if the IAB node 2400 is the upper-level IAB node, the sending unit 2401 may send downlink data corresponding to the first category to the lower-level IAB node. The receiving unit 2402 may receive uplink data corresponding to the first category from the lower-level IAB node.

Figure 25:
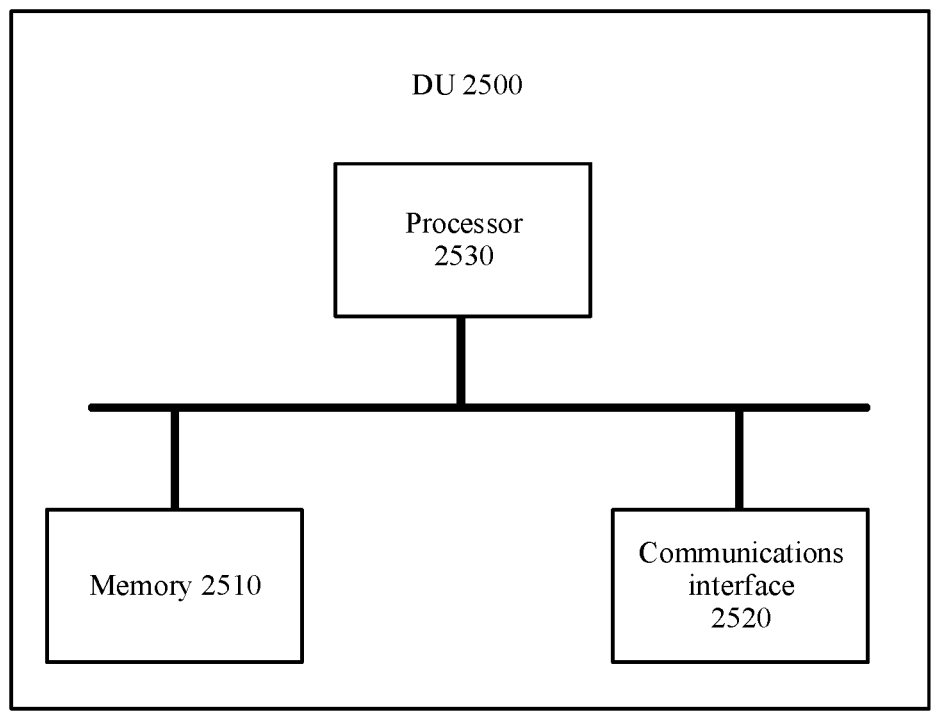
FIG. 25 is a schematic structural diagram of a DU according to another embodiment of this application.

FIG. 25 is a schematic structural diagram of a DU 2500 according to an embodiment of this application. The DU 2500 can perform the steps performed by the access network device in the embodiments of this application. To avoid repetition, details are not described herein. As shown in FIG.

25, the DU 2500 includes one or more processors 2530, one or more memories 2510, and one or more communications interfaces 2520. The processor 2530 is configured to control the communications interface 2520 to send and receive a signal. The memory 2510 is configured to store a computer program. The processor 2530 is configured to: invoke the computer program from the memory 2510 and run the computer program, so that the DU 2500 performs the following operations:

sending an interface setup request message to a CU, where the interface setup request message is used to request to set up a tunnel between the DU and the CU, and the tunnel corresponds to a first category; and receiving an interface setup response message from the CU.

Optionally, the interface setup response message may include uplink tunnel transmission information corresponding to the first category.

Optionally, the interface setup request message may include downlink tunnel transmission information corresponding to the first category.

Alternatively, the DU 2500 sends a DU reconfiguration update message to the CU, and the DU reconfiguration update message is used to indicate to update a category supported by the DU and a downlink tunnel transmission address corresponding to the category. After sending the DU reconfiguration update message, the DU 2500 receives a DU reconfiguration update acknowledge message from the CU.

Alternatively, the DU 2500 receives a CU reconfiguration update message from the CU, and the CU reconfiguration update message is used to indicate to update a category supported by the CU. After receiving the CU reconfiguration update message, the DU 2500 sends a CU reconfiguration update acknowledge message to the CU.

Alternatively, the DU 2500 receives a user equipment context setup request message from the CU, and sends a user equipment context setup response message to the CU. Optionally, the user equipment context setup request message may include the uplink tunnel transmission information corresponding to the first category. Optionally, the user equipment context setup response message may include the downlink tunnel transmission information corresponding to the first category.

Optionally, the DU 2500 in this embodiment of this application may not include the one or more memories 2510.

Figure 26:
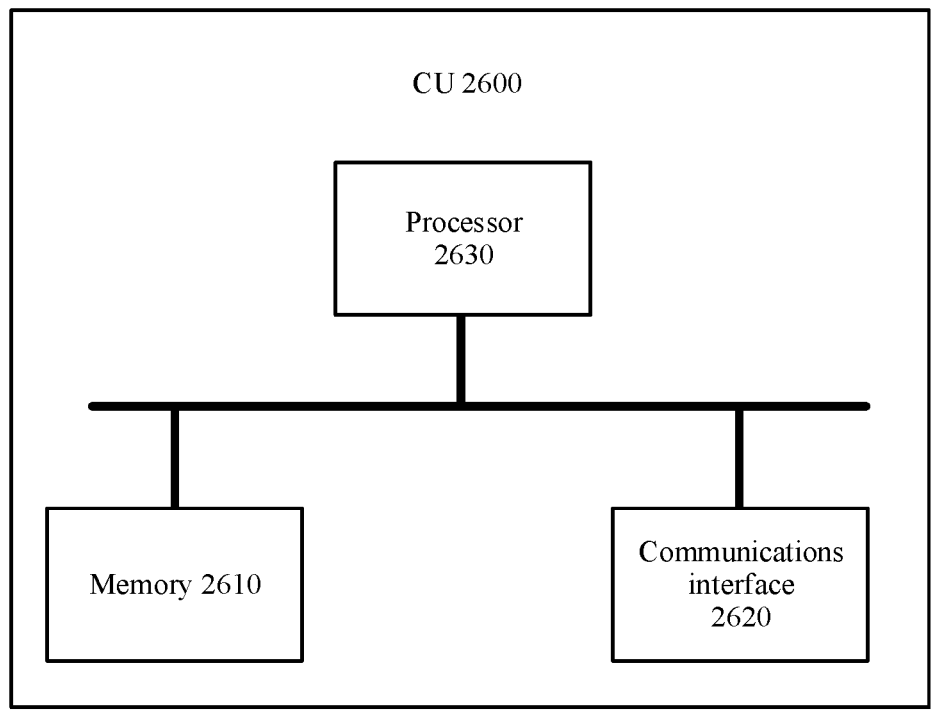
FIG. 26 is a schematic structural diagram of a CU according to another embodiment of this application.

FIG. 26 is a schematic structural diagram of a CU 2600 according to an embodiment of this application. The CU 2600 can perform the steps performed by the access network device in the embodiments of this application. To avoid repetition, details are not described herein. As shown in FIG. 26, the CU 2600 includes one or more processors 2630, one or more memories 2610, and one or more communications interfaces 2620. The processor 2630 is configured to control the communications interface 2620 to send and receive a signal. The memory 2610 is configured to store a computer program. The processor 2630 is configured to: invoke the computer program from the memory 2610 and run the computer program, so that the CU 2600 performs the following operations:

receiving an interface setup request message to a DU, where the interface setup request message is used to request to set up a tunnel between the DU and the CU, and the tunnel corresponds to a first category; and sending an interface setup response message to the DU.

Optionally, the interface setup response message may include uplink tunnel transmission information corresponding to the first category.

Optionally, the interface setup request message may include downlink tunnel transmission information corresponding to the first category.

Alternatively, the CU 2600 receives a DU reconfiguration update message from the DU, and the DU reconfiguration update message is used to indicate to update a category supported by the DU and a downlink tunnel transmission address corresponding to the category. After receiving the DU reconfiguration update message, the CU 2600 sends a DU reconfiguration update acknowledge message to the DU.

Alternatively, the CU 2600 sends a CU reconfiguration update message to the CU, and the CU reconfiguration update message is used to indicate to update a category supported by the CU and an uplink tunnel transmission address corresponding to the category. After sending the CU reconfiguration update message, the CU 2600 receives a CU reconfiguration update acknowledge message from the DU.

Alternatively, the CU 2600 sends a user equipment context setup request message to the DU, and receives a user equipment context setup response message from the DU. Optionally, the user equipment context setup request message may include the uplink tunnel transmission information corresponding to the first category. Optionally, the user equipment context setup response message may include the downlink tunnel transmission information corresponding to the first category.

Optionally, the CU 2600 in this embodiment of this application may not include the one or more memories 2610.

Figure 27:
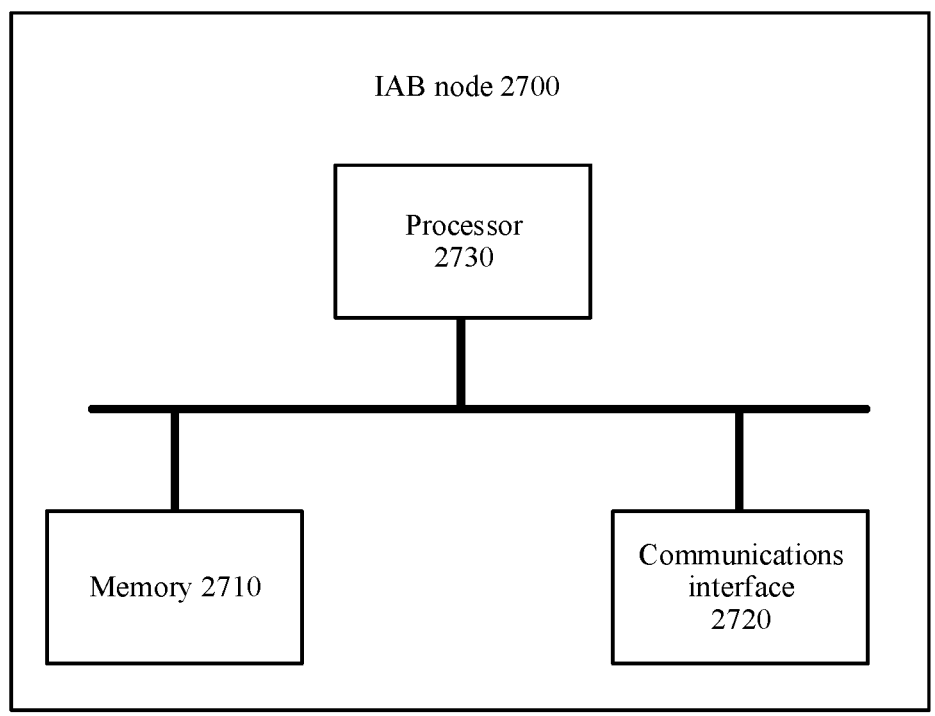
FIG. 27 is a schematic structural diagram of an IAB node according to another embodiment of this application.

FIG. 27 is a schematic structural diagram of an IAB node 2700 according to an embodiment of this application. The IAB node 2700 can perform the steps performed by the access network device in the embodiments of this application. To avoid repetition, details are not described herein. As shown in FIG. 27, the IAB node 2700 includes one or more processors 2730, one or more memories 2710, and one or more communications interfaces 2720. The processor 2730 is configured to control the communications interface 2720 to send and receive a signal. The memory 2710 is configured to store a computer program. The processor 2730 is configured to: invoke the computer program from the memory 2710 and run the computer program, so that the IAB node 2700 performs corresponding procedures and operations that are performed by the IAB node in this embodiment of this application. For example, the IAB node 2700 may perform steps or procedures performed by the IAB donor node 210 in FIG. 21, or may perform steps or procedures performed by the IAB node 211, the IAB node 212, or the IAB node 213 in FIG. 21. The processor 2730 is configured to:

if the IAB node 2700 is a lower-level IAB node, send a tunnel setup request message to an upper-level IAB node, where the tunnel setup request message is used to request to set up a tunnel between the lower-level IAB node and the upper-level IAB node, and the tunnel corresponds to a first category; and after sending the tunnel setup request message, receive a tunnel setup request response message from the upper-level IAB node.

Alternatively, if the IAB node 2700 is an upper-level IAB node, the processor 2730 is configured to: receive a tunnel setup request message from a lower-level IAB node, where the tunnel setup request message is used to request to set up a tunnel between the lower-level IAB node and the upper-level IAB node, and the tunnel corresponds to a first category; and after receiving the tunnel setup request message, send a tunnel setup request response message to the lower-level IAB node.

Alternatively, if the IAB node 2700 is the lower-level IAB node, the processor 2730 may send corresponding uplink data to the upper-level IAB node, and receive downlink data corresponding to the first category from the upper-level IAB node.

Alternatively, if the IAB node 2700 is the upper-level IAB node, the processor 2730 sends downlink data corresponding to the first category to the lower-level IAB node, and receives uplink data corresponding to the first category from the lower-level IAB node.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    sending, by an access network device, a request message to a core network device, wherein the request message is used to request to set up a communication connection between the access network device and the core network device, and the communication connection corresponds to a first category; and
    receiving, by the access network device, a response message sent by the core network device, wherein the response message comprises transport layer information for uplink transmission that corresponds to the first category.

2. The method according to claim 1, wherein the first category is a first network slice, a first packet data unit (PDU) session type, or a first access technology.

3. The method according to claim 1, further comprising:
    receiving, by the access network device, uplink data from a terminal device; and
    in response to the uplink data belonging to the first category, sending, by the access network device, the uplink data to the core network device based on the transport layer information for the uplink transmission.

4. The method according to claim 3, wherein the terminal device is currently configured in a first radio resource control (RRC) mode, and the first RRC mode comprises at least one of:
    the terminal device storing a context corresponding to the first category;
    the terminal device storing an identifier of the first category;
    the terminal device being configured to transmit data corresponding to the first category; and
    the terminal device being configured to perform communication based on a paging cycle of the first category.

5. The method according to claim 1, wherein the first category is the first network slice, and the method further comprises:
    sending, by the access network device, a first notification message to the terminal device, wherein the first notification message comprises at least one of an area identifier of the first network slice, an identifier of the first network slice, a paging cycle of the first network slice, a paging area of the first network slice, and security information of the first network slice.

6. The method according to claim 1, wherein the first category is the first PDU session type, and the method further comprises:
    sending, by the access network device, a second notification message to the terminal device, wherein the second notification message comprises an area identifier of the first PDU session type, an identifier of the first PDU session type, a paging cycle of the first PDU session type, a paging area of the first PDU session type, and security information of the first PDU session type.

7. The method according to claim 1, wherein the first category is the first access technology, and the method further comprises:
sending, by the access network device, a third notification message to the terminal device, wherein the third notification message comprises an area identifier of the first access technology, an identifier of the first access technology, a paging cycle of the first access technology, a paging area of the first access technology, and security information of the first access technology.

8. The method according to claim 1, wherein the request message comprises transport layer information for downlink transmission that corresponds to the first category, and the method further comprises:
receiving, by the access network device from the core network device, first downlink data corresponding to the first category; and
broadcasting, by the access network device, the first downlink data.

9. The method according to claim 1, further comprising:
receiving, by the access network device, a first paging message from the core network device, wherein the first paging message comprises second downlink data corresponding to the first category; and
sending, by the access network device, a second paging message, wherein the second paging message comprises the second downlink data.

10. The method according to claim 1, wherein the communication connection is used to transmit uplink data and/or downlink data of at least two terminal devices.

11. A communication method, comprising:
receiving, by a core network device, a request message from an access network device, wherein the request message is used to request to set up a communication connection between the access network device and the core network device, and the communication connection corresponds to a first category; and
sending, by the core network device, a response message to the access network device, wherein the response message comprises transport layer information for uplink transmission that corresponds to the first category.

12. The method according to claim 11, wherein the first category is a first network slice, a first packet data unit (PDU) session type, or a first access technology.

13. The method according to claim 11, wherein the request message comprises transport layer information for downlink transmission that corresponds to the first category, and the method further comprises:
receiving, by the core network device, first downlink data corresponding to the first category; and
sending, by the core network device to the access network device based on the transport layer information for the downlink transmission, the first downlink data corresponding to the first category.

14. The method according to claim 11, further comprising:
receiving, by the core network device, second downlink data corresponding to the first category; and
sending, by the core network device, a first paging message to the access network device, wherein the first paging message comprises the second downlink data.

15. The method according to claim 11, wherein the communication connection is used to transmit uplink data and/or downlink data of at least two terminal devices.

16. An access network device, comprising:
a sending unit configured to send a request message to a core network device, wherein the request message is used to request to set up a communication connection between the access network device and the core network device and the communication connection corresponds to a first category; and
a receiving unit configured to receive a response message sent by the core network device, wherein the response message comprises transport layer information for uplink transmission that corresponds to the first category.

17. The device according to claim 16, wherein the first category is a first network slice, a first packet data unit (PDU) session type, or a first access technology.

18. The device according to claim 16, wherein:
the receiving unit is further configured to receive uplink data from a terminal device; and
the sending unit is further configured to send the uplink data to the core network device based on the transport layer information for the uplink transmission in response to the uplink data belonging to the first category.

19. The device according to claim 18, wherein the terminal device is currently configured in a first radio resource control (RRC) mode, and the first RRC mode comprises at least one of:
the terminal device storing a context corresponding to the first category;
the terminal device storing an identifier of the first category;
the terminal device being configured to transmit data corresponding to the first category; and
the terminal device being configured to perform communication based on a paging cycle of the first category.

20. A core network device, comprising:
a receiving unit configured to receive a request message from an access network device, wherein the request message is used to request to set up a communication connection between the access network device and the core network device and the communication connection corresponds to a first category; and
a sending unit configured to send a response message to the access network device, wherein the response message comprises transport layer information for uplink transmission that corresponds to the first category.

* * * * *